US012732410B2

(12) United States Patent
Mandal

(10) Patent No.: US 12,732,410 B2
(45) Date of Patent: Sep. 8, 2026

(54) HEALTH EVALUATION AND AUTO REMEDIATION BASED ON OFF-CLUSTER LOGSET

(71) Applicant: Dell Products, L.P., Round Rock, TX (US)

(72) Inventor: Apu Mandal, Plymouth, MN (US)

(73) Assignee: DELL PRODUCTS, L.P., Round Rock, TX (US)

( * ) Notice: Subject to any disclaimer, the term of this patent is extended or adjusted under 35 U.S.C. 154(b) by 186 days.

(21) Appl. No.: 18/403,176

(22) Filed: Jan. 3, 2024

(65) Prior Publication Data

US 2025/0219892 A1 Jul. 3, 2025

(51) Int. Cl.

*H04L 41/0604* (2022.01)
*H04L 41/0659* (2022.01)
*H04L 41/069* (2022.01)

(52) U.S. Cl.

CPC ...... *H04L 41/0627* (2013.01); *H04L 41/0661* (2023.05); *H04L 41/069* (2013.01)

(58) Field of Classification Search

CPC ............. H04L 41/0627; H04L 41/0661; H04L 41/069

See application file for complete search history.

(56) References Cited

U.S. PATENT DOCUMENTS 11,394,629 B1 * 7/2022 Grilli ........................ G06F 7/08
2021/0042180 A1 * 2/2021 Sutton ................. G06F 11/0727
2021/0266340 A1 * 8/2021 Grounds ............. H04L 63/1433
2023/0064625 A1 * 3/2023 Patti .................... G06F 11/2257
2024/0248790 A1 * 7/2024 Verma ................ G06F 11/0712

* cited by examiner

*Primary Examiner* — Philip C Lee

(74) *Attorney, Agent, or Firm* — Amin, Turocy & Watson, LLP

(57) ABSTRACT

Various systems and methods are presented herein regarding identifying an operational issue are a data server, automatically identifying/implementing an action to fix the operational issue. The data server can be co-located with a collection of data servers in a server cluster. The action can be configured to be specifically implemented at the data server without affecting an operational status of the other data servers in the collection of data servers. The action can be a server reboot/reset instruction, terminate operation of an application, and suchlike. The operational issue can be compared with a prior operational issue having an associated action, wherein the associated action can be utilized as the action to fix the operational issue at the data server. Over time, respective actions implemented at the one or more data servers in the server cluster can be compiled from which a software service pack can be subsequently compiled and distributed.

20 Claims, 12 Drawing Sheets

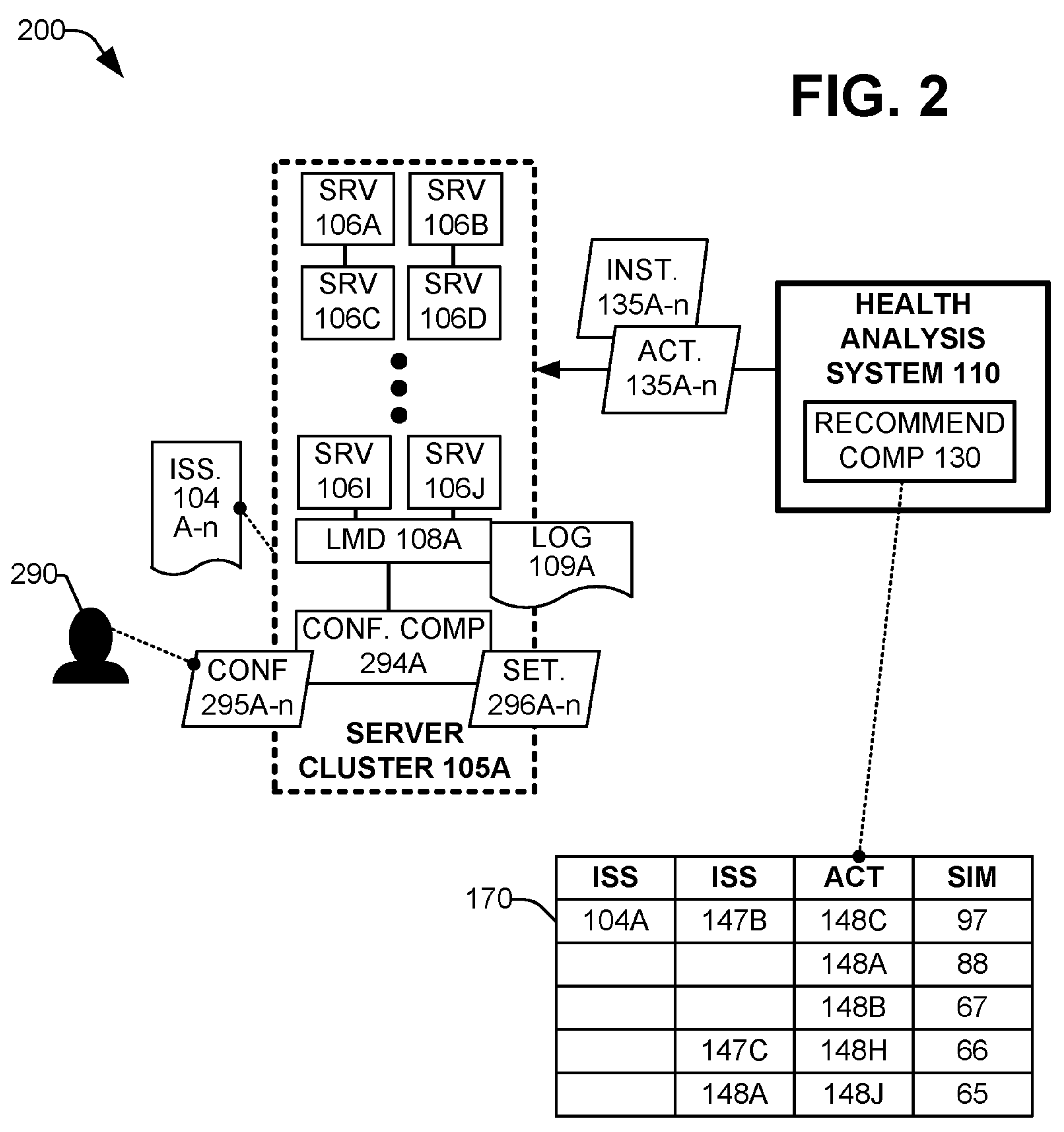
| ISS | ISS | ACT | SIM |
|---|---|---|---|
| 104A | 147B | 148C | 97 |
| | | 148A | 88 |
| | | 148B | 67 |
| | 147C | 148H | 66 |
| | 148A | 148J | 65 |

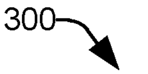
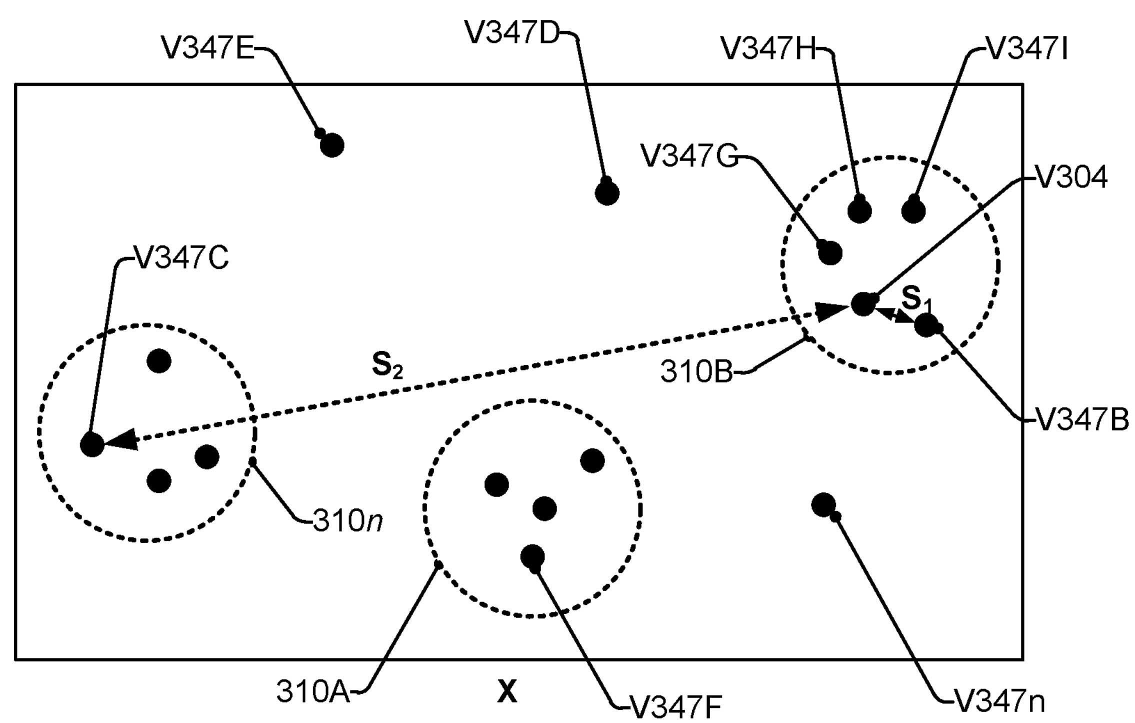
FIG. 3

HEALTH EVALUATION AND AUTO REMEDIATION BASED ON OFF-CLUSTER LOGSET

BACKGROUND

The subject disclosure relates to data centers, and more specifically remote monitoring and/or control of operation of one or more data servers to resolve an operational issue at the data center.

SUMMARY

The following presents a summary to provide a basic understanding of one or more embodiments described herein. This summary is not intended to identify key or critical elements, or delineate any scope of the different embodiments and/or any scope of the claims. The sole purpose of the Summary is to present some concepts in a simplified form as a prelude to the more detailed description presented herein.

In one or more embodiments described herein, systems, devices, computer-implemented methods, methods, apparatus and/or computer program products are presented that facilitate automatically identifying an operational issue at a data server, and further automatically identifying and implementing an action to correct/fix/repair the operational issue at the data server.

According to one or more embodiments, a system is provided to configure operation of one or more CPUs to correct an operational issue at a data server. The system can comprise at least one processor, and a memory coupled to the at least one processor and having instructions stored thereon, wherein, in response to the at least one processor, the instructions facilitate performance of operations. The operations can comprise receiving a notification of a current operational issue, wherein the current operational issue is occurring at a data server and further identifying a prior operational issue having at least one feature comparable to the current operational issue according to a defined similarity criterion. The operations can further comprise identifying an action associated with the prior operational issue and implementing the action on the data server to address the current operational issue.

In an embodiment, the data server can be included in a collection of servers located in a server cluster, whereby the system can be remotely located from the server cluster. In an embodiment, the notification can comprise an identifier configured to identify at least one of the data server, at least one component included in the data server, an application hosted by the data server, or a location of the server cluster.

In an embodiment, the action can comprise at least one of rebooting the data server, power cycling the data server, terminating operation of the data server, terminating operation of an application hosted by the data server, adjusting a system configuration pertaining to the data server, adjusting a configuration of an application implemented on the data server, throttle operation of an application implemented on the data server, adjust an operational threshold of an application hosted on the data server, or adjust an operational threshold of a component pertinent to operation of the data server, and suchlike.

In another embodiment, the collection of servers comprises an nth server, while implementing operation of the action on the data server, a current operational status of the nth server remains unchanged.

In a further embodiment, the action implemented at the data server is an edited action, wherein the operations can further comprise informing a customer support system of the action; and in response to the informing, receiving an edit to the action via information received from the customer support system, to generate the edited action.

In a further embodiment, the action is a first action, and the operations can further comprise (a) receiving a notification that the first action did not fix the current operational issue at the data server, (b) identifying a second action associated with the prior operational issue, and (c) implementing the second action at the data server to address the current operational issue In another embodiment, the notification is a first notification, wherein the operations can further comprise receiving a second notification regarding implementation of the action at the data server, wherein the second notification comprises (a) first information indicative that the action was implemented at the data server; or (b) second information indicative that the implementation of the action is awaiting confirmation to implement the action at the data server, wherein the confirmation can be received from an entity associated with operation of the data server. The embodiments can further comprise updating the action to indicate whether the action has been implemented at the data server or is awaiting implementation at the data server.

In other embodiments, elements described in connection with the disclosed systems can be embodied in different forms such as computer-implemented methods, computer program products, or other forms. In an embodiment, the computer-implemented method can comprise identifying, by a device comprising a processor, in a compilation of prior operational issues, a first prior operational issue pertaining to a current operational issue identified at a first data server, further identifying, by the device, a first action associated with the first prior operational issue, and further facilitating, by the device, implementing the first action on the first data server to address the current operational issue. In an embodiment, the first data server can be included in a collection of data servers located in a same server cluster.

In another embodiment, the computer implemented method can further comprise parsing, by the device, a logset reporting operation of the first data server and identifying, by the device, the current operational issue in the logset. In an embodiment, the logset can be generated in accordance with a defined schedule.

In an embodiment, the collection of servers can further comprise a second data server, and wherein the first action is configured for implementation at the first data server, while operation of the second server remains unchanged as a function of the first action being implemented on the first data server. In an embodiment, the first action can comprise at least one of rebooting the first data server, power cycling the first data server, terminating operation of the first data server, terminating operation of an application hosted by the first data server, adjusting a system configuration pertaining to the first data server, adjusting a configuration of an application implemented on the first data server, throttle operation of an application implemented on the first data server, adjust an operational threshold of an application hosted on the first data server, or adjust an operational threshold of a component pertinent to operation of the first data server, and suchlike.

In another embodiment, the first prior operational condition action can be included in a collection of actions associated with the prior operational issue, and wherein the operations further comprise: (a) identifying a second action associated with the prior operational issue, wherein the second action is determined to have a lower probability of fixing the current operational issue than the first action; and (b) implementing the second action at the first data server.

Another embodiment can further comprise a computer program product stored on a non-transitory computer-readable medium and comprising machine-executable instructions, wherein, in response to being executed, the machine-executable instructions cause computing equipment to perform operations, the operations comprising: receiving first data representative of a first current operational issue occurring at a first data server included in a collection of servers located in a server cluster, further comprising identifying second data representative of a prior operational issue similar to the first current operational issue according to a defined similarity criterion, and further comprising based on the first data and the second data, identifying third data representative of a series of actions associated with the prior operational issue, wherein the series of actions was previously identified for implementation to fix the prior operational issue.

The operations can further comprise ranking the series of actions as a function of respective capabilities to fix the first current operational issue, further selecting a first action, wherein the first action is the highest ranked action in the series of actions, and further generating an instruction instructing that the first action be implemented on the first data server. The operation can further comprise transmitting the instruction to the first data server to implement the first action, wherein implementation of the instruction on the first data server is configured such that operation of the second server remains unchanged.

In an embodiment, the first action can comprise at least one of rebooting the first data server, power cycling the first data server, terminating operation of the first data server, terminating operation of an application hosted by the first data server, adjusting a system configuration pertaining to the first data server, adjusting a configuration of an application implemented on the first data server, throttle operation of an application implemented on the first data server, adjust an operational threshold of an application hosted on the first data server, or adjust an operational threshold of a component pertinent to operation of the first data server.

In another embodiment, the instruction is a first instruction, and wherein the operations further comprise: (a) receiving a second current operational issue, wherein the second current operational issue can be received from a second data server; (b) determining the second current operational issue can be comparable to the first current operational issue according to the defined similarity criterion; (c) generating a second instruction instructing that the first action be implemented on the second data server; and (d) transmitting the second instruction to the second data server to implement the first action on the second data server. In an embodiment, the first data server and the second data server can be located in different server clusters.

DESCRIPTION OF THE DRAWINGS

One or more embodiments are described below in the Detailed Description section with reference to the following drawings:

FIG. 2 illustrates a server cluster configuration for confirmation of implementation of a recommended action, in accordance with an embodiment.

FIG. 3 illustrates a plot depicting clustering of respective vectors generated by vectorizing a current issue and prior issues in accordance with one or more embodiments.

DETAILED DESCRIPTION

Figure 1A:
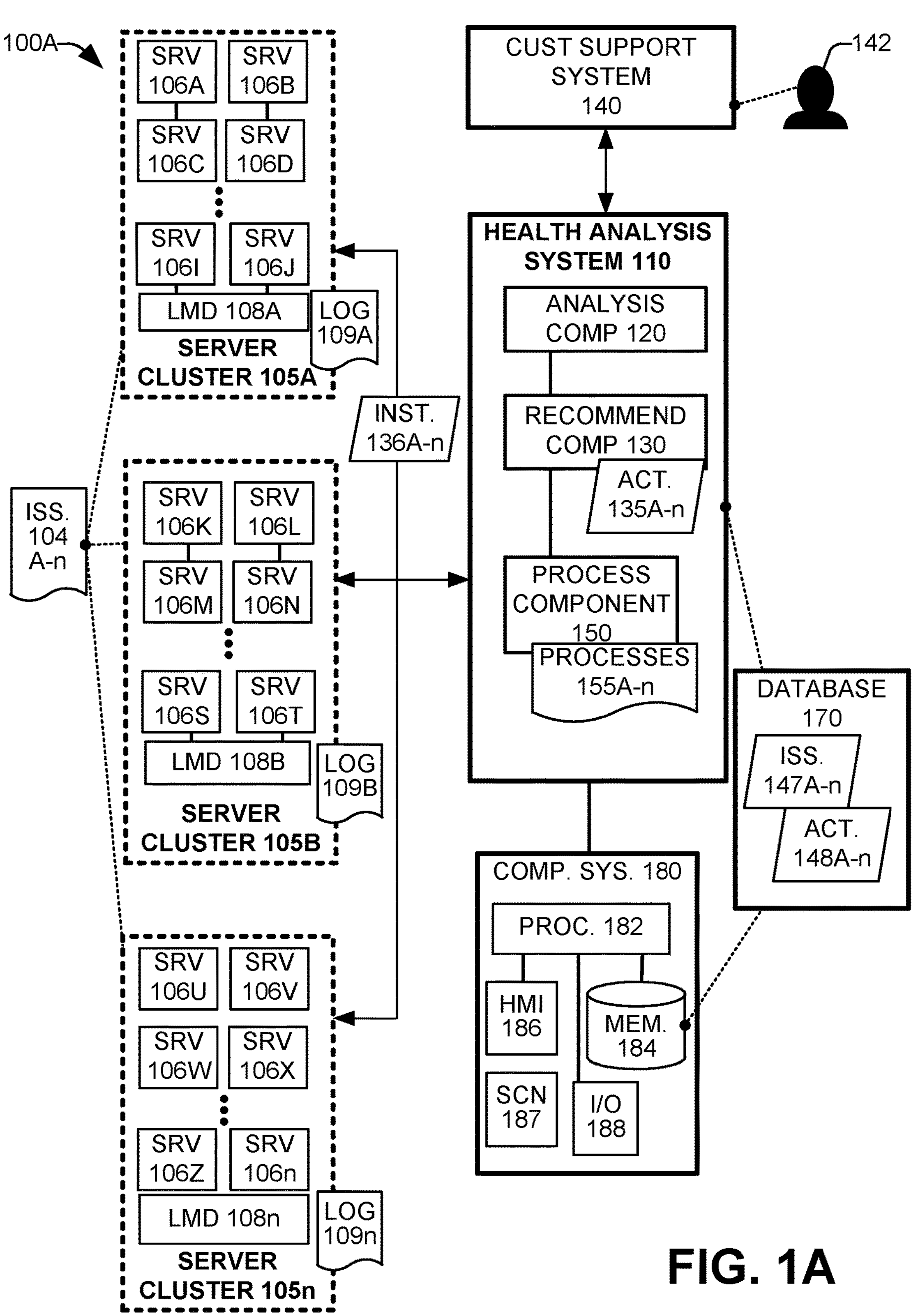
FIG. 1A illustrates a system that can be utilized to troubleshoot/resolve one or more operational issues arising at one or more servers in respective server clusters, in accordance with one or more embodiments.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Ranges A-n are utilized herein to indicate a respective plurality of devices, components, statements, attributes, etc., where n is any positive integer.

The various embodiments presented herein can be implemented in a data center environment to facilitate improving operational efficiency of one or more data servers (aka server(s)) at the data center, wherein the one or more servers can be co-located in a server cluster comprising two or more servers.

A server cluster can comprise of a collection of data servers. On-cluster monitoring software can be utilized to facilitate identification and troubleshooting of an operational issue at the server cluster, whereby the on-cluster monitoring software can be configured to gain the attention of/notify a system administrator, as well as potentially initiate manual intervention to resolve the issue. However, it is common for the issue to be complex in nature, such that the system administrator/customer initiates engagement of customer support by creating a service request (SR), whereby the customer support entity may be remotely located from the server cluster of concern. Typically, customer support/service do not have direct access to the server cluster and rely on operational logsets (aka logs, log data set, log-sets, report) collected from the server cluster system and transferred to a central monitoring system (e.g., where customer support is located). Customer support can apply several diagnostic tools against the operational logset to diagnose/resolve the issue. In an example method of resolution, a customer support entity may manually apply the respective diagnostic tools in a sequential, one-by-one, manner. Once the issue is diagnosed, customer support can engage with the customer/client regarding how to apply a fix, resolve the issue, and eventually close the SR ticket.

Typically, the process of issue analysis and resolution is manual, time consuming, and often causes application of the issue resolution activity to be performed belatedly such that damage to a digital operation/infrastructure may have already occurred. Further, the same operational issue may be present/exist across multiple server clusters, whereby application of a manual fix at a first server cluster does not scale/migrate across the multiple server clusters. Accordingly, the total time to resolution (TTR) can be impacted and may take hours or days which can give rise to (a) a costly endeavor to a customer and (b) a deleterious impact on business for the supplier of the server cluster system.

A conventional response to an issue is to have a software service pack (software patch) release ready and roll out to an impacted customer. However, significant delay may occur between an issue arising at a server and the intervening weeks to generate the software service pack, e.g., software service pack development, validation, and certification. Further, in the event of a software service pack being available/released, extensive engagement between the customer (e.g., user of the server cluster) and the customer support (e.g., representing the manufacturer/supplier of the server cluster) may be required to enable the software service pack to be applied to the server cluster system.

The various embodiments presented herein are directed towards automating an entirety of workflow in resolving an issue at a data server, generating one or more recommended actions (if/as required) to fix the issue, and further delivering the recommended action for implementation on the affected server and/or to a customer service system for further review (e.g., prior to implementation). Delivery of the recommended action to the affected server can be auto-staged, whereby the receiving entity can configure for the recommended action to be implemented automatically, or interactively apply the action via a consent process. The various embodiments facilitate auto-remediation of an issue arising at a single data server located in a cluster of data servers. Various artificial intelligence and machine learning techniques and technologies can be utilized in resolving an issue and further generating/recommending an action to implement at the data server.

A client/entity/customer may have a server cluster comprising two or more servers. Typically, when an issue arises at a cluster of servers, collectively, operation of each of the servers in the collection/cluster of servers has to be ceased, e.g., temporarily or permanently, to enable troubleshooting of the issue affecting operation of the one or more servers in the cluster of servers.

However, to minimize interruption of operation of the respective servers in the cluster of servers, per the various embodiments presented herein, operation of a specific server (e.g., a first data server located in a server cluster comprising n-data servers) experiencing the operational issue can be isolated and troubleshooted, while operation of the other servers co-located with the first server in the server cluster remain uninterrupted. Accordingly, an issue at a first server can be address that does not disrupt operation of the other servers co-located with the first server, wherein the issue can pertain to any of an application hosted on the first server, service provide/hosted by the first server, a component/device issue at the first server, performing a workload at the first server, and suchlike.

Multiple server clusters may be in operation, e.g., a first server cluster is operational at a first client's location, a second server cluster is operational at a second client's location, an nth server cluster is operational at an nth client's location. Further, the respective servers in the various server clusters may be common, such that an issue affecting, for example, a first server at a first server cluster operated by a first customer is the same as an issue affecting a second server at a second server cluster operated by a second customer, e.g., the first server and second server are the same model/version. Hence, as the issue at the first cluster is troubleshooted and resolved, it is possible that the same resolution (e.g., action) can be applied to address the issue at the second cluster. Conventionally, a software patch may be distributed to update software controlling operation of the cluster of servers, respective servers in a cluster of servers, and suchlike. However, the software patch is typically generated and distributed at a time substantially later than when an issue affecting operation of server arises. Hence, an expedited resolution of the present issue is required to enable optimal operation of the respective servers located in the one or more server clusters.

Further, at a scheduled time, e.g., daily at 8 PM, a logset can be compiled at a server cluster, regarding operation of the one or more servers at the server cluster (e.g., at a first server cluster), and transmitted to the centralized monitoring system for further review. The operational logset can be reviewed and compared with operational/historical data compiled for a server/server cluster (e.g., a second server cluster) for which an operational issue was identified, and hopefully resolved. In the event of the operational condition(s) at the first data server is similar to an operational condition(s) at the second data server at the time when the issue was present at the second data server, the resolution applied to second data server can be applied to the first data server to resolve the issue/potential issue occurring at the first data server. In such a scenario, a system/entity monitoring operation of the server cluster and generating the logset may be unaware of an issue at a particular, however, automated review of the logset detects a first server is exhibiting early symptoms of an issue that previously occurred on a second server.

In an embodiment, resolution of the issue may comprise initiating an action/activity at a server, e.g., reset/reboot the server, turn the server off, and suchlike. In another embodiment, the resolution of the issue may comprise generation and transmission of operational code (e.g., a software patch) that can be created at the central monitoring system, transmitted to the server cluster/client experiencing the issue, and automatically/manually applied to control operation of the server cluster and/or server experiencing the issue. Accordingly, automatically troubleshooting and auto-resolution of an issue can be conducted in a timely manner from when the issue was first detected.

Hence, per the various embodiments presented herein, troubleshooting of an operational issue/potential operational issue at a server can be conducted in a timely manner as well as preemptively, enabling minimal disruption to operation of a server cluster in which the identified server is located/operational within. Accordingly, by enabling such timely and/or preemptive resolution of an issue, client operations (e.g., digital workload/operations such as data processing, data storage, and suchlike) can be minimally affected while the issue is being resolved. The term workload(s) is used herein to convey the various activities associated with processing/hosting data (e.g., in a digital format, code, information) at one or more data centers and the various operations, processes, workflows, computations, analytics, algorithm execution, maintaining, updating, and the like, performed on the data as a function of a client's activity regarding the data. Workload activities can range, for example, from storing and maintaining data on a data server, through to executing algorithms to analyze and/or modify the data (e.g., as a function of operations performed at a data center and/or remotely), transmission of data, receiving one or more instructions regarding processing of the data, updating data, replicating data, and the like.

Turning now to the drawings, FIG. 1A illustrates a system 100A that can be utilized to troubleshoot/resolve one or more operational issues arising at one or more servers in respective server clusters, in accordance with one or more embodiments. System 100A comprises one or more server clusters 105A-n communicatively coupled to a centralized health analysis system (HAS) 110. Each server cluster 105A-n can include one or more data servers 106A-n, whereby a handful of servers 106A-n can be located/operating at a server cluster 105A-n through to hundreds of servers 106A-n. For example, a first server cluster 105A includes data servers 106A-J, a second server cluster 105B includes data servers 106K-T, . . . , and an nth server cluster 105*n* includes data servers 106U-n. In an example scenario, the various server clusters 105A-n can be located at same/common locations or disparate locations, with a single entity operating all of the server clusters 105A-n or different entities operating one or more server clusters 105A-n. In another example scenario, HAS 110 and respective server clusters 105A-n can be operated by a common entity, or HAS 110 is operated by a first entity (e.g., manufacturer/supplier) while a respective server cluster 105A-n can be operated by a second entity (e.g., a client/customer), such that the first entity provides operational support to the second entity regarding operation of the respective server cluster 105A-n. In an embodiment, HAS 110 can be remotely located (e.g., off cluster) from the one or more server clusters 105A-n.

A local monitoring device (LMD) 108A-n can be configured to monitor operation/operational health of the respective servers 106A-n in the respective server cluster 105A-n, e.g., a first LMD 108A is located at first server cluster 105A, a second LMD 108B is located at second server cluster 105B, an nth LMD 108*n* is located at nth server cluster 105*n*. In an embodiment, LMDs 108A-n can comprise any suitable interface (e.g., extensible storage engine (ESE)) configured to compile respective operational logsets 109A-n regarding operation of the server cluster 105A-n and/or servers 106A-n to which the LMDs 108A-n are respectively communicatively coupled. In an embodiment, the LMD 108A-n can be considered to be an on-cluster device, e.g., LMDs 108A-n are respectively located at a respective server cluster 105A-n, while HAS 110 can be considered to be an off-cluster system, e.g., HAS 110 is remotely located from, but communicatively coupled to respective server clusters 105A-n. In an embodiment, the operational logsets 109A-n can be generated and transmitted in accordance with various schema/timing. For example, the respective LMDs 108A-n can be configured to monitor operation of the respective server cluster 105A-n and generate/transmit an operational logset 109A-n at a defined time, e.g., every 12 hours, every 24 hrs, and suchlike.

Generation/transmission of an operational logset 109A-n according to a fixed schedule can be utilized when respective LMDs 108A-n do not detect any potential issue regarding operation of the respective server clusters 105A-n/servers 106A-n. In another example, the respective LMDs 108A-n can be configured to generate/transmit an operational logset 109A-n regarding operation of the respective server clusters 105A-n/servers 106A-n in response to a determination/detection by the respective LMD 108A-n that a current/potential issue 104A-n regarding operation of a respective server cluster 105A-n/server 106A-n might be present and requires review.

In one or more embodiments, HAS 110 can include an analysis component 120, and further, a recommendation component 130. Analysis component 120 can be configured to receive the respective logsets 109A-n and automatically parse/review the logsets 109A-n to identify any issues 104A-n that may be present in the logset(s) 109A-n. As further described, analysis component 120 can be configured to, in a non-limiting list, (a) automatically identify an issue 104A-n, (b) proceed to analyze the issue 104A-n, and/or (c) notify an entity 142A-n (e.g., customer service personnel at customer support system 140) of an issue 104A-n. It is to be appreciated that while customer support system 140 is depicted in FIG. 1A as being separate but communicatively coupled to HAS 110, customer support system 140 can be located within/as part of HAS 110.

Recommendation component 130 can be configured to identify one or more actions 135A-n (aka, corrective action(s), current action(s)) which can be undertaken to resolve the issue 104A-n, whereby the action 135A-n can be further transmitted (e.g., in instruction 136A-n) to the server cluster 105A-n/server 106A-n undergoing issue 104A-n. Recommendation component 130 can be further configured to transmit the action 135A-n to the customer support system 140, enabling further review/editing of the issue 104A-n and proposed action 135A-n, e.g., by a customer support entity 142A-n. Interaction between HAS 110 and customer support system 140 can be via any suitable technology, e.g., an application programming interface (API), a representational state transfer API (REST API), and suchlike.

As part of identifying/generating an action 135A-n, recommendation component 130 can review prior issues 147A-n and associated prior actions 148A-n compiled/stored in database 170 (e.g., stored in memory 184) to identify any prior issues 147A-n that are the same or similar to the current issue 104A-n and further, any prior actions 148A-n implemented in resolving the same/similar prior issues 147A-n, such that related prior actions 148A-n can be utilized as/incorporated into action 135A-n.

As further described herein, in the event of a determination of no prior issues 147A-n or supplemental information 149A-n pertains to the current issue 104A-n (e.g., by similarity component 230), recommendation component 130 can be further configured to generate and transmit a notification 232A-n to a customer support system 140 indicating that further review of current issue 104A-n is required (e.g., by a customer support entity 142). In such an event, any findings/actions generated by customer support entity 142 can be applied to database 170.

As further described, HAS 110 can further include a process component 150 configured to implement various processes 155A-n as required to enable issues 104A-n to be identified, and further, one or more actions 135A-n to be generated and implemented. Process component 150 can be configured to operate in conjunction with various components (e.g., analysis component 120, recommendation component 130, and suchlike) included in HAS 110, customer support system 140, database 170, and computer system 180. Processes 155A-n can include various artificial intelligence (AI) and machine learning (ML) techniques and technologies as further described below.

In an embodiment, rather than an action 135A-n requiring all of the servers 106A-n in a particular server cluster 105A-n to be affected by the action 135A-n, action 135A-n can be generated and directed towards a particular server, e.g., focused on server 106A, while the remainder of the servers in server cluster 105A, e.g., servers 106B-106J, can remain in normal operation and unaffected by the action 135A. For example, action 135A might be an instruction for server 106A to restart while servers 106B-106J remain in continued operation. Actions 135A-n to be performed at the server 106A-n of concern, include, in a non-limiting list, turn off the server, reboot/restart the server, power cycle the first data server, terminating operation of the server, terminate operation of an application hosted by the server, adjust a system configuration(s) pertaining to the server 106A, adjust a configuration of an application hosted/implemented on server 106A, throttle operation of an application hosted/implemented on server 106A, adjust an operational threshold of an application hosted/implemented on server 106A, adjust an operational threshold of a device/component pertinent to operation of server 106A, and suchlike. In an embodiment, selection of action(s) 135A-n to be performed at server 106A is such to not negatively impact operation of servers 106B-n during or after the selected action 135A-n is being/has been implemented. Accordingly, one or more operations/workloads by entity 290, or a client/customer of entity 290 (e.g., where entity 290's server cluster 105A-n/servers 106B-n are hosting applications/services for the customer) are not negatively/deleteriously affected by implementation of the selected action 135A-n in addressing the 104A-n.

For example, server 106A has an issue 104A comprising an application running thereon causing a memory leak (e.g., utilizing an abnormal/excessive amount of memory), action 135A can be configured to reboot the server 106A to restart the application. Further review of issue 104A indicates that the application has a software bug causing the memory leak, but the software bug cannot be fixed for three weeks-however, by having the issue 104A identified, action 135A can entail rebooting the server 106A on a defined schedule to periodically reset the application thereby limiting the effects of the memory leak until the application can be fixed.

In a further embodiment, a first issue 104A may be detected at server 106A in server cluster 105A and a second issue 104K may be detected at server 106K in server cluster 105B, whereby first issue 104A and second issue 104K may be detected such that first issue 104A and second issue 104K are occurring concurrently/almost concurrently and have the same operational condition/symptom. The respective logsets 109A and 109B, comprising issues 104A and 104K, can be respectively generated by LMD's 108A and 108B and transmitted to HAS 110. As mentioned, analysis component 120 can be configured to review logset 109A, and while analysis component 120 is identifying the first issue 104A for subsequent resolution, analysis component 120 further receives the second issue 104K and identifies first issue 104A and second issue 104K are related even though occurring on separate servers 106A and 106K in disparate server clusters 105A and 105B. Analysis component 120 can be further configured to associate second issue 104K with first issue 104A, whereby an action 135A-n can be identified/generated that singly resolves both of issues 104A and 104K. Hence, per the various embodiments presented herein, HAS 110 is configured to concurrently identify and resolve issues 104A-n. Such concurrent issue resolution in a conventional server cluster system is complex, and potentially impossible, to implement as a first customer support engineer is resolving an issue 104A while being unaware that a second customer support engineer is resolving an issue 104K, where issues 104A and 104K are in actuality related and may even have exactly the same conditions of concern giving rise to issues 104A and 104K. As further described herein, more than one actions 135A-n may be identified to address issue 104A such that each action 135A-n can be implemented, e.g., first action 135A is implemented, if the issue 104A still remains unresolved, second action 135B can be implemented, etc., until issue 104A is resolved.

Any information pertinent to an issue 104A-n can be provided in a logset 109A-n to enable an action 135A-n to be determined and implemented. For example, the information can include one or more identifiers of particular servers 106A-n, server clusters 105A-n, etc., such as model numbers, componentry, applications installed/running thereon, memory usage, operational efficiency, and suchlike. In an embodiment, while resolving an issue 104A at a first server 106A, HAS 110 can obtain information pertinent to the first server 106A such as server model number. Analysis component 120 and recommendation component 130 can be configured to identify issue 104A relates to a server issue, and accordingly, other servers 106B-n are identified that are the same model as server 106A. HAS 110 can be configured to apply action 135A to other servers 106B-n related to server 106A, e.g., HAS 110 is operating preemptively/proactively to avoid occurrence of issue 104A at servers 106B-n. Further, action 135A has sufficient information pertaining thereto such that when an issue 104B-n is subsequently received at HAS 110, the related issue 104A and action 135A previously stored in database 170, can be quickly identified and the action 135A applied to resolve the subsequent issue 104B-n. Compilation of a series of consecutive logsets 109A-n received from a server enables an operational history of the server to be generated, e.g., by analysis component 120, enabling operational trends/changes to be identified, enabling identification of an issue 104A-n.

In a further embodiment, while a logset 109A-n can be generated at a server cluster 105A-n response to an actual/potential issue 104A-n arising at a respective server 106A-n (e.g., as detected by respective LMD 108A-n), even when LMD 108A-n does not detect a current issue 104A-n at a respective server 106A-n, HAS 110 can be configured to review a logset 109A-n that is generated at a defined period (e.g., 6 PM each evening), the logset 109A-n can be reviewed to determine whether a server 106A-n is displaying a symptom(s) similar to a previously processed prior issue 147A-n. Hence, the symptom can be identified (e.g., by parse component 210, as further described) as a potential issue 104A-n to be reviewed/resolved by HAS 110.

As further shown, HAS 110 can be communicatively coupled to/include a computer system 180. Computer system 180 can include a memory 184 that stores the respective computer executable components (e.g., analysis component 120, recommendation component 130, process component 150, parse component 210, vector component 220, similarity component 230, data historian 280, and suchlike, as further described herein) and further, a processor 182 configured to execute the computer executable components stored in the memory 184. Memory 184 can further be configured to include database 170, and thus store any of current issue 104A-n, logsets 109A-n, recommended action 135A-n, instructions 136A-n, prior issues 147A-n, prior actions 148A-n, processes 155A-n, thresholds 235A-n, similarity indexes $S_{1-n}$, vectors Vn, supplemental information 149A-n, notifications 212A-n, 270A-n, 232A-n, edits 244A-n, and suchlike (as further described herein). The computer system 180 can further include a human machine interface (HMI) 186 (e.g., a display, a graphical-user interface (GUI)) which can be configured to present various information including current issue 104A-n, logsets 109A-n, recommended action 135A-n, instructions 136A-n, prior issues 147A-n, prior actions 148A-n, processes 155A-n, thresholds 235A-n, similarity indexes $S_{1-n}$, vectors Vn, supplemental information 149A-n, notifications 212A-n, 270A-n, 232A-n, edits 244A-n, and suchlike, (as further described) per the various embodiments presented herein. HMI 186 can include an interactive display/screen 187 to present the various information. Computer system 180 can further include an I/O component 188 to receive and/or transmit respectively current issue 104A-n, logsets 109A-n, recommended action 135A-n, instructions 136A-n, prior issues 147A-n, prior actions 148A-n, settings for thresholds 235A-n, supplemental information 149A-n, notifications 212A-n, 270A-n, 232A-n, edits 244A-n, and suchlike. Any suitable technology can be utilized for interaction/communication by I/O 188, e.g., file transfer protocol (FTP), simple radio standalone (SRS), and suchlike.

Figure 1B:
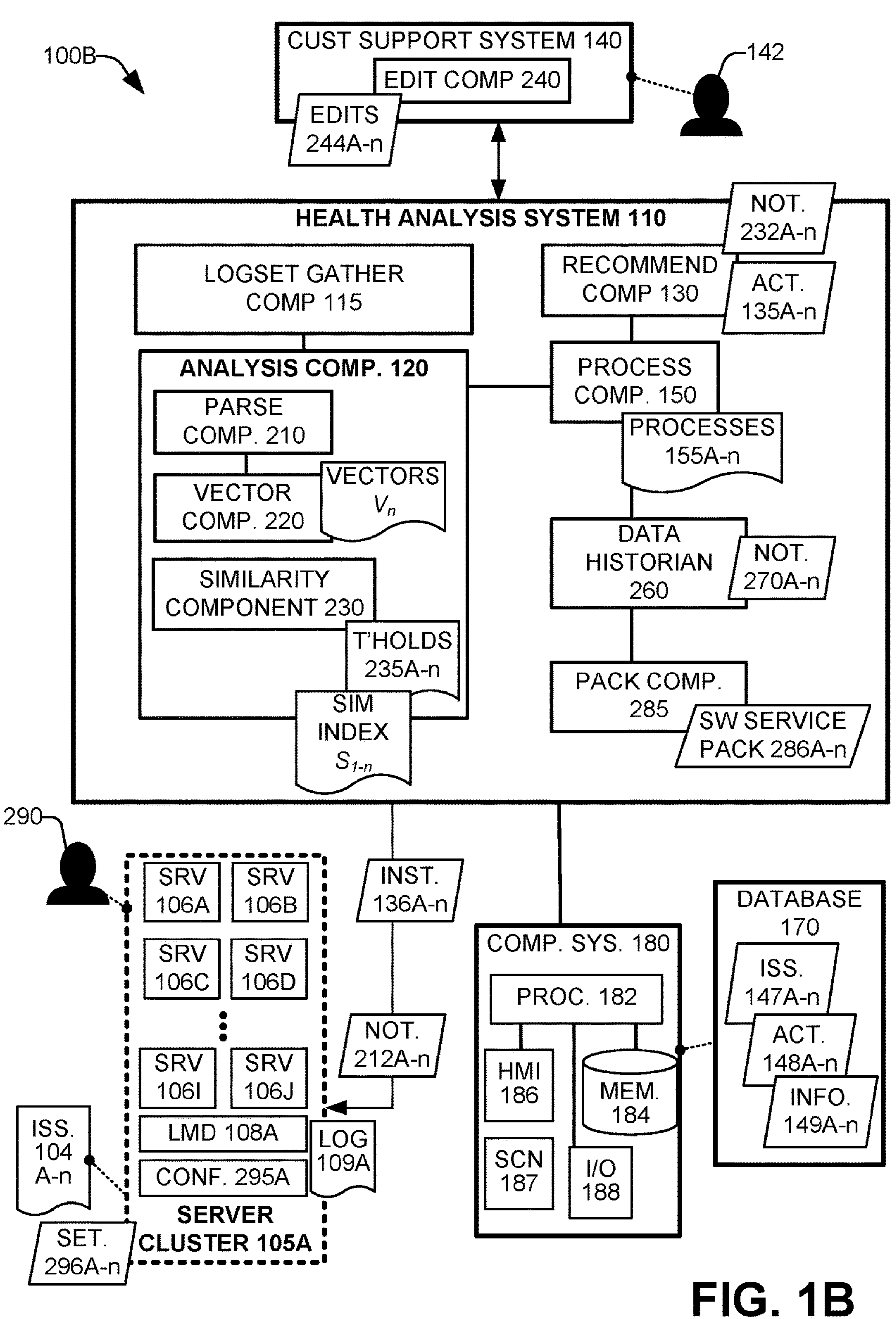
FIG. 1B illustrates a system that can be utilized to troubleshoot/resolve one or more operational issues arising at one or more servers in respective server clusters, in accordance with one or more embodiments.

FIG. 1B illustrates a system 100B that can be utilized to troubleshoot/resolve one or more operational issues arising at one or more servers in respective server clusters, in accordance with one or more embodiments. System 100B is presented to further describe components and operations presented in FIG. 1A. As previously mentioned, HAS 110 can be communicatively coupled to respective server clusters 105A-n and respective servers 106A-n. An analysis component 120 can be configured to monitor operation of the server clusters 105A-n/servers 106A-n, identify one or more actions 135A-n to implement regarding one or more issues 104A-n arising at the server clusters 105A-n/servers 106A-n. Further recommendation component 130 can be configured to recommend/implement respective actions 135A-n on server clusters 105A-n/servers 106A-n. Operations at HAS 110 can be performed automatically, e.g., in conjunction with processor 182 and memory 184.

It is to be appreciated that while only one server cluster 105A/servers 106A-J are depicted in FIG. 1B, as shown in FIG. 1A, numerous server clusters 105A-n and respective servers 106A-n can be communicatively coupled to HAS 110.

As shown in FIG. 1B, HAS 110 can include a logset gather component 115 configured to receive the logsets 109A-n, save the logsets 109A-n (e.g., in database 170/memory 184), and notify respective components in HAS 110 and customer support system 140 of the new logsets 109A-n.

As also shown in FIG. 1B, analysis component 120 can further comprise a parse component 210. Parse component 210 can be configured to analyze logsets 109A-n to identify issues 104A-n contained in logsets 109A-n and further identify information/metadata/content/context pertaining to issues 104A-n in logsets 109A-n. Accordingly, the parse component 210 can be configured to identify distinct topics in logsets 109A-n pertaining to issues 104A-n, enabling the issues 104A-n to be analyzed with a high degree of granularity, enabling comparison with prior issues 147A-n and actions 148A-n having a comparable level of granularity. In an embodiment, the parse component 210 can be further configured to convert issues 104A-n, recommended actions 135A-n, prior issues 147A-n, prior actions 148A-n, edits 244A-n, and suchlike, to a respective format as required for a respective activity, wherein parse component 210 can include an assembler, disassembler, and suchlike, configured to convert issues 104A-n, recommended actions 135A-n, etc., from a machine code format to a human readable format, and vice versa. Accordingly, any of issues 104A-n, recommended actions 135A-n, prior issues 147A-n, prior actions 148A-n, and suchlike, can be in a form for machine-code level processing as well as human readable format for such activity as review of a recommended action 135A-n by a customer support entity 142.

Analysis component 120 can further include a vector component 220 and a similarity component 230. Analysis component 120 can be configured to analyze the issues 104A-n and the prior issues 147A-n to identify one or more prior issues 147A-n having similarity to the current issue 104A-n ranging from a low degree of similarity (e.g., no match) through to a high degree of similarity (e.g., a match), and any intermediate degree of similarity therebetween.

The vector component 220 can be configured to automatically process/vectorize the respective issues 104A-n and prior issues 147A-n. As part of processing the respective content in the current issues 104A-n and prior issues 147A-n, each respective current issue 104A-n and prior issue 147A-n can be defined/represented by the vector component 220 as a vector Vn, (e.g., where n represents current issue 104A-n and prior issue 147A-n, etc.) wherein the vector schema utilized can be any of a two-dimensional vector through to a multi-dimensional vector (e.g., a vector of many dimensions). Vector component 220 can be configured to convert content, e.g., alphanumerics, binary code, etc., of the respective issues 104A-n/147A-n into vectorized content. Respective content in current issue 104A-n and prior issue 147A-n having a similar vector representation can form clusters when represented on a similarity plot (e.g., as further described with reference to FIG. 3). Accordingly, those issues 104A-n and 147A-n having a common topic/content will likely have a similar multi-dimensional representation, thereby forming a cluster.

Analysis component 120 can further include a similarity component 230 configured to automatically determine a degree of similarity S (e.g., a similarity index $S_{1-n}$) between the current issue 104A-n and one or more prior issues 147A-n which have been previously characterized/associated with a respective action 148A-n. In an example implementation utilizing a similarity criterion, per FIG. 3, a similarity $S_{1-n}$ can be assessed based on similarity/dissimilarity as identified based on distance between respective values of vectors Vn. Similarity component 230 can be configured to function with one or more thresholds 235A-n. For example, a threshold 235A has to be exceeded for an acceptable degree of similarity S to be inferred between current issue 104A-n and one or more prior issue 147A-n. In an embodiment, thresholds 235A-n can be established as a function of distance between two vectors, such that a distance $S_1$ indicates 95% similarity, a distance $S_2$ indicates 85% similarity, a distance $S_3$ indicates 75% similarity, a distance of $S_4$ or less indicates a similarity of less than 75% (with the similarity component 230 inferring that no similarity exists), and suchlike. It is to be appreciated that any suitable determination/criterion of similarity S can be utilized for the various embodiments presented herein.

HAS 110 can further include a data historian 260 configured to receive and process notification 270A-n. In response to receiving the current issue 104A-n and any recommended/associated action 135A-n/148A-n, the data historian 260 can be further configured to archive the issue 104A-n and recommended/associated action 135A-n/148A-n (e.g., an issue 104A-n becomes a prior issue 147A-n), and suchlike, in database 170, such that issue 104A-n and recommended action 135A-n, and suchlike, are added to/supplement the prior issues 147A-n and actions 148A-n. Accordingly, the knowledge gained by resolving a current issue 104A-n and implementing an action 135A-n, can be utilized to process a future issue 104A-n subsequently received at HAS 110. In another embodiment, in the event of an issue 104A-n is unable to be resolved with a sufficient degree of confidence (e.g., a particular threshold 235A-n of similarity was not met), the respective issue 104A-n can be archived and as the number of prior issues 147A-n in database 170 are further supplemented over time, the respective issue 104A-n can be re-evaluated based on the subsequent knowledge compiled in the compiled issues 147A-n and associated actions 148A-n.

In an embodiment, in the event of an issue 104A-n is incorrectly processed, e.g., an unrelated action 148A-n is assigned to an issue 104A-n by one or more processes 155A-n, knowledge regarding the incorrectly assigned action 148A-n can be utilized to train/fine-tune the one or more processes 155A-n to improve the probability of an issue 104A-n being correctly assigned an action 148A-n in the future.

The recommendation component 130 and/or data historian 280 can be further configured to generate and transmit a notification 270A-n indicating a status of associating an issue 104A-n with a prior issue 147A-n and/or an action 148A-n. For example, a notification 270A-n can provide information regarding issue 104A-n, prior issues 147A-n, actions 148A-n, any information regarding similarity thresholds 235A-n being met/not met, whether it was not possible to identify a prior issue 147A_n pertaining to current issue 104A-n with an acceptable degree of certainty of similarity, respective vector values Vx for the issue 104A-n and prior issues 147A-n, determined degrees of similarity $S_{1-n}$, information regarding content/context of the issue 104A-n and prior issues 147A-n, any recommendations generated by a recommendation component 130 regarding actions 148A-n, what AI/ML processing (e.g., processes 155A-n) was applied to enable determination of a similar issue 147A-n and action 148A-n, a characterization of issue 104A-n, threshold 235A-n determination, identification of prior issues 147A-n and actions 148A-n, and suchlike. The notification 270A-n can be made available in any suitable manner, e.g., presented on a screen 187 of HMI 186, transmitted to a respective LMD 108A-n/server cluster 105A-n, a system administrator/entity 290 at a server cluster 105A-n, to customer support system 140, a customer support entity 142, and suchlike, e.g., via the I/O 188.

In an embodiment, HAS 110 can further include a software service pack component 285 configured to compile issues 104A-n/147A-n and actions 135A-n/148A-n generated/implemented over a period of time to generate software service pack 286A-n. As previously mentioned, a software service pack 286A-n can be generated and distributed for application at server clusters 105A-n and servers 106A-n. To assist an entity (e.g., customer support entity 142) to generate software service pack 286A-n, the respective issues 104A-n/147A-n and actions 135A-n/148A-n can be compiled and presented to the entity (e.g., via HMI 186) for incorporation into the software service pack 286A-n.

Further, customer support system 140 can include an edit component 240 configured to capture any edits, amendments, actions performed by customer support entity 142 in reviewing/implementing an issue 104A-n and possible action 135A-n. Customer support system 140 can include respective devices/components (e.g., an HMI 186, screen 187, I/O 188, and suchlike) enabling interaction/edit 244A-n by entity 142 and the presented issue 104A-n and possible action 135A-n. Entity 142 can (a) amend the action 135A-n prior to the action 135A-n being transmitted/implemented, (b) deny implementation of action 135A-n, and suchlike. Any actions/edits 144A-n performed by entity 142, e.g., editing action 135A-n, denying implementation of action 135A-n, etc., can be captured by edit component 240 and further stored in database 170. As well as the amended action 135A-n being available for implementation to address a current issue 104A-n, the interaction 144A-n, issue 104A-n, and amended possible action 135A-n can be utilized to train/fine-tune one or more processes 155A-n utilized in any of (a) parsing issue 104A-n, (b) identifying one or more prior issues 147A-n being same/similar to the current issue 104A-n, (c) identifying a prior action 148A-n to address issue 104A-n, and suchlike.

In FIG. 2, system 200 illustrates a server cluster configuration for confirmation of implementation of a recommended action, in accordance with one or more embodiments. In an embodiment, an instruction 136A-n including an action 135A-n can be automatically implemented on a server cluster 105A-n/server 106A-n or authorization/confirmation is required prior to implementation. As shown, a server cluster 105A-n can include a confirmation component 294A-n having a confirmation setting 296A-n associated therewith. In an embodiment, the confirmation setting 296A-n can be configured with a setting of "confirmation required before implementing" such that the systems analyst 290 at server cluster 105A-n is required to review and confirm implementation of the action 135A-n before action 135A-n is implemented. In another embodiment, the confirmation setting 296A-n can be configured with a setting of "automatically implement" the action 135A-n on the respective server 106A-n. As confidence increases with implementing an action 135A-n, likelihood of the automatic implementation increases which can further expedite implementation of the action 135A-n.

As further shown in FIG. 2, database 170 can present the respective prior issues 147A-n and prior actions 148A-n ranked with regard to applicability to the current issue 104A-n, as a function of similarity, as further described in FIG. 3. Similarity component 230, in conjunction with processes 155A-n, provides a similarity measure $S_n$ such that prior action 148C of prior issue 147B is determined to be the most likely action 148A-n to address issue 104A (S=97%) while prior action 148J of prior issue 147A is determined by similarity component 230 to be the least likely action 148A-n to address issue 104A.

As mentioned, HAS 110 can include a process component 150 and processes 155A-n. It is to be appreciated that processes 155A-n can comprise any AI/ML model/technology/technique/architecture utilized to automatically identify one or more prior issues 147A-n having content similar to the content of a current issue 104A-n, and further automatically generate a recommended action 135A-n, wherein action 135A-n can be based on, for example, prior actions 148A-n. Process component 150 can be utilized to implement processes 155A-n in conjunction with any of the other components included in HAS 110, e.g., analysis component 120, recommendation component 130, parse component 210, vector component 220, similarity component 230, edit component 240, data historian 280, service pack component 285, and suchlike.

It is to be appreciated that the various processes 155A-n and operations presented herein are simply examples of respective AI and ML operations and techniques, and any suitable technology can be utilized in accordance with the various embodiments presented herein. Processes 155A-n can be based on application of terms, codes, statements, etc., in the current issue 104A-n, current action 135A-n, prior issue 147A-n, prior actions 148A-n, supplemental information 149A-n, and suchlike. In an example embodiment, processes 155A-n can include a vectoring technique such as bag of words (BOW) text vectors, and further, any suitable vectoring technology can be utilized by vector component 220, e.g., Euclidean distance, cosine similarity, etc. Other suitable AI/ML technologies that can be applied can include, in a non-limiting list, any of vector representation via term frequency-inverse document frequency (tf-idf) capturing term/token frequency in the current issue 104A-n versus prior issue 147A-n, and prior actions 148A-n, neural network embedding layer vector representation of terms/categories (e.g., common terms having different tense), a transformer neural network, bidirectional and auto-regressive transformer (BART) model architecture, a bidirectional encoder representation from transformers (BERT) model, long short term memory network (LSTM) operation(s), a sentence state LSTM (S-LSTM), a deep learning algorithm, a sequential neural network, a sequential neural network that enables persistent information, a recurrent neural network (RNN), a convolutional neural network (CNN), a neural network, capsule network, a machine learning algorithm, a natural language processing (NLP) technique, sentiment analysis, bidirectional LSTM (BiLSTM), stacked BiLSTM, and suchlike. Accordingly, in an embodiment, implementation of the analysis component 120, recommendation component 130, parse component 210, vector component 220, similarity component 230, data historian 280, and suchlike, with processes 155A-n, enables natural language processing (NLP) (e.g., utilizing vectors) to be implemented on an issue 104A-n.

Language models, LSTMs, BARTs, etc., can be formed with a neural network that is highly complex, for example, comprising billions of weighted parameters. Training of the language models, etc., can be conducted, e.g., by process component 150, with datasets, whereby the datasets can be formed using any suitable technology, such as current/prior issues 104A-n/147A-n and current/prior actions 135A-n/148A, and suchlike. The prior issues 147A-n and actions 148A-n can be available from many sources, e.g., collected from implementation of HAS 110 in resolving an issue 147A-n as well as provided by a client 290, provided by a third party (e.g., manufacturer/vendor of a component included in HAS 110), provided by a customer support entity 142, and suchlike, e.g., as supplemental information 149A-n which can also be utilized by processes 155A-n to generate one or more actions 148A-n.

Further, current/prior issues 104A-n/147A-n, current/prior actions 135A-n/148A-n, edits 244A-n, and suchlike, can comprise text, alphanumerics, numbers, single words, phrases, short statements, long statements, expressions, syntax, source code statements, machine code, etc. Fine-tuning of a process 155A-n can comprise application of a current/prior issues 104A-n/147A-n and current/prior actions 135A-n/148A-n, edits 244A-n, and suchlike to the process 155A-n, process 155A-n is correspondingly adjusted by application of the current/prior issues 104A-n/147A-n and current/prior actions 135A-n/148A-n, edits 244A-n, and suchlike, such that, for example, weightings in the process 155A-n are adjusted by application of the current/prior issues 104A-n/147A-n and current/prior actions 135A-n/148A-n, edits 244A-n, and suchlike.

As mentioned, portions of code in any of current/prior issues 104A-n/147A-n and current/prior actions 135A-n/148A-n, edits 244A-n, and suchlike having a similar vector representation can form clusters when represented on a similarity plot. In FIG. 3, plot 300 illustrates clustering of respective vectors generated by vectorizing a current issue and prior issues in accordance with one or more embodiments. Plot 300 represents a two-dimensional plot of various vectors Vx and potential cluster formation, whereby vectors V347A-n are mathematical representations of the prior issues 147A-n, and vector V304 is a mathematical representation of a current issue 104A-n. As shown in FIG. 3, the distance, e.g., similarity distance $S_n$, between respective vector values Vx indicates the degree of similarity between the issues 104A-n and 147A-n derived from the vectors V304 and V347A. Per the example schematic presented in FIG. 3, a similarity distance $S_1$ can be determined (e.g., by similarity component 230) between the value of vector V304 and vector V347A, and further, a similarity distance $S_4$ can be determined between the value of vector V304 and vector V347B. Hence, given that similarity distance $S_1$ is less than similarity distance $S_4$, an inference can be made (e.g., by similarity component 230) that the content of current issue 104A has a high degree of similarity with the content of prior issue 147A, while the content of current issue 104A has a low degree of similarity with the content of prior issue 147B. As previously mentioned, the degree of similarity between current issue 104A-n and prior issue 147A can be determined based on a threshold 235A reflecting a proximity of a first vector generated from current issue 104A and a second vector generated from a prior issue 147A-n, enabling ranking of similarity.

The similarity component 230 can be configured to determine similarity based on text, semantics, textual summarization, etc., between various items of interest (e.g., pairings of current issue 104A-n and respective prior issues 147A-n). To enable subsequent review of the current issue 104A-n and prior issues 147A-n, clusters of vectors can be analyzed. Any suitable clustering technique (e.g., in processes 155A-n) can be utilized by the similarity component 230, e.g., vector quantization (VQ). In an embodiment, similarity component 230 can cluster the vectors V347A-n and V304 based on their respective vector representation. For example, a k-means clustering algorithm, such as a radius-based k-means clustering algorithm, can be applied by the similarity component 230 to cluster the vectors V347A-n and V304 into clusters comprising vectors that have the same, similar, or approximate value. Hence vectors in cluster 310A represent issues (e.g., issues 104A and 147A-n) having similar functionality/content, and similarly clusters 310B, 310C, and 310*n* comprise codes having respectively similar functionality/content.

Figure 4:
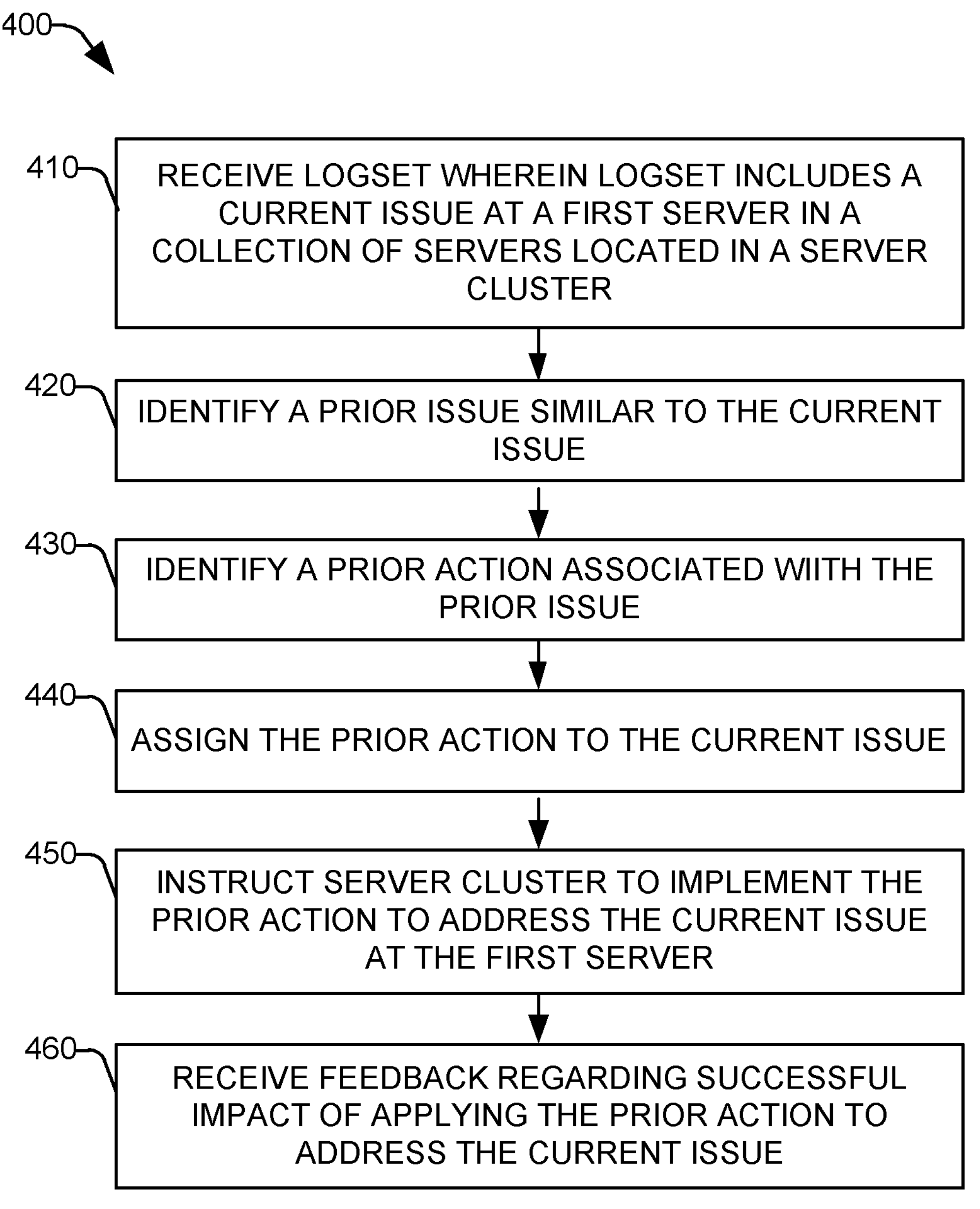
FIG. 4 illustrates a computer-implemented process for automatically identifying an operational issue at a data server and further automatically identifying/implementing an action to address/fix the issue, according to one or more embodiments.

In FIG. 4, process 400 illustrates a computer-implemented process for automatically identifying an operational issue at a data server and further automatically identifying/implementing an action to address/fix the issue, according to one or more embodiments.

At 410, a logset (e.g., logset 109A-n) can be received at a health analysis system (e.g., by logset gather component 115 at HAS 110). The logset can be received from a local monitoring device (e.g., LMD 108A-n) monitoring operation of a server cluster (e.g., server cluster 105A-n) having a collection of data servers (e.g., data servers 106A-n) operating thereon. The logset can be generated by the local monitoring device (a) in accordance with a defined schedule, (b) when an operational issue (e.g., operational issue 104A-n) is detected by the local monitoring device occurring at a data server, (c) and suchlike. To minimize operational impact across the collection of servers, an operation at a first data server (e.g., an operation to address an operational issue at a first data server 106A) should not impact operation at the other data servers in the server cluster.

At 420, the logset can be parsed (e.g., by parse component 210 and processes 155A-n) to identify one or more operational issues presented in the logset. An operational issue can be vectored (e.g., by vector component 220) and compared (e.g., by similarity component 230) with previously identified/processed issues (e.g., prior issues 147A-n). Various comparison technologies (e.g., processes 155A-n utilized by vector component 220, similarity component 230, and process component 150) can be utilized to determine the similarity between an identified current operational issue (e.g., current issue 104A) and any of the prior issues.

At 430, the prior issues can have associated prior actions (e.g., prior actions 148A-n) implemented in previously addressing the prior issue. The respective prior actions can be processed (e.g., by vector component 220, similarity component 230, recommendation component 130, process component 150) in conjunction with the prior issues to identify one or more prior actions to implement to address the current issue. The prior actions can be ranked with regard to potential to fix/address the current issue.

At 440, the one or more prior actions can be assigned (e.g., by the recommendation component) to address the current issue, such that one or more current actions (e.g., actions 135A-n) are recommended for implementation at the data server.

At 450, an instruction (e.g., instruction 136A-n) can be generated by the recommendation component, wherein the instruction can include the recommended action (aka recommended corrective action). In an embodiment, the instruction can include a sequence of actions to implement, such that the local monitoring device can implement the actions in order of preference (e.g., as defined by the recommendation component and similarity measure $S_n$)—hence, rather than an (a) implement a first action, (b) determine and report back on success of first action, (c) in event of first action failed, implement second action, etc., to expedite the correction process the instruction can include a sequence of actions for the local monitoring device to step through to correct the issue.

At 460, feedback can be generated (e.g., by local monitoring device in a notification 212A-n) regarding the success of implementing the recommended action in fixing the issue, and whether another recommended action should be applied to fix the issue.

Figure 5:
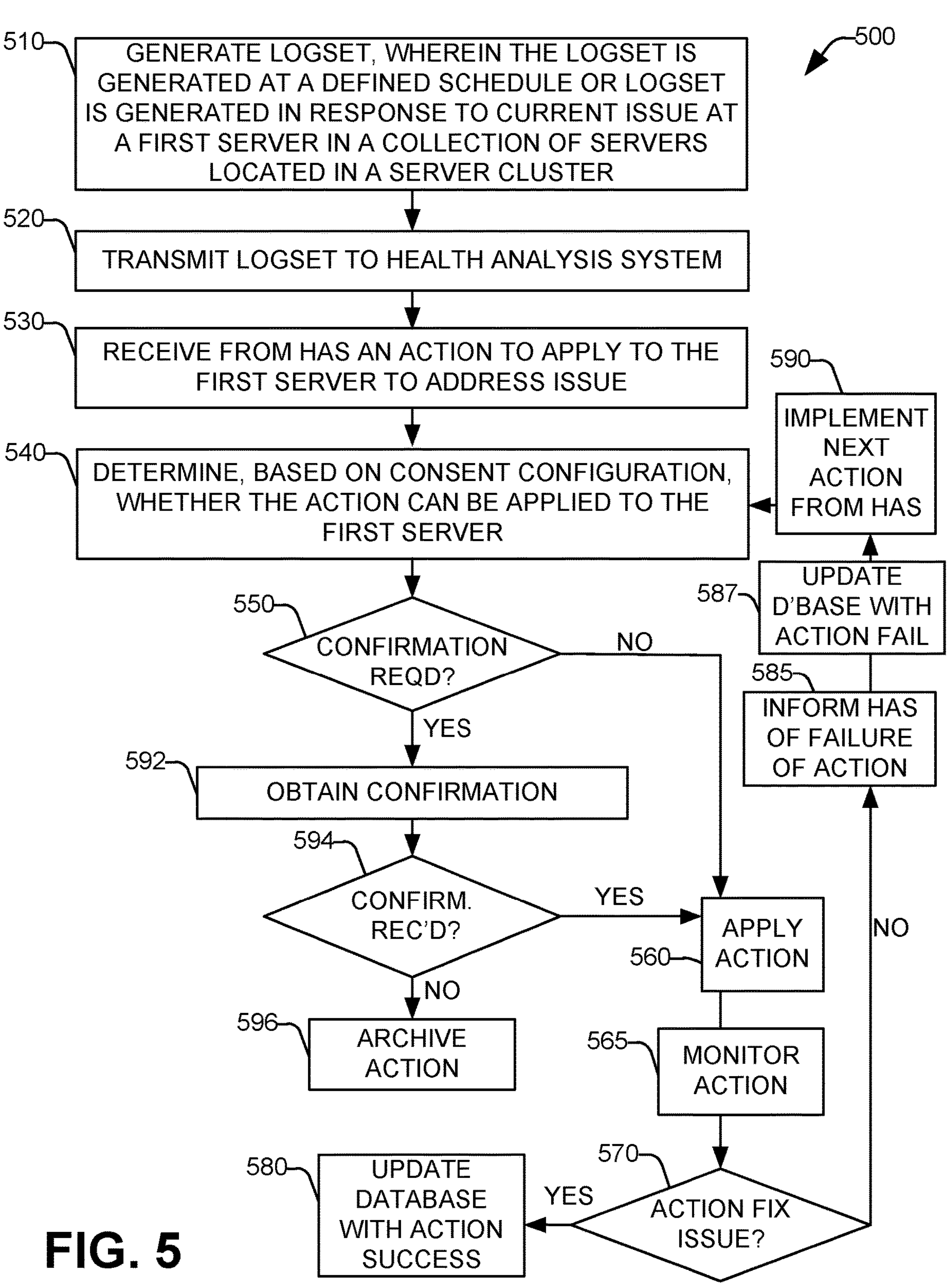
FIG. 5 illustrates a computer-implemented process for implementing a corrective action at a data server, according to one or more embodiments.

In FIG. 5, process 500 illustrates a computer-implemented process for implementing a corrective action at a data server, according to one or more embodiments.

At 510, a logset (e.g., logset 109A-n) can be generated by a local monitoring device (e.g., LMD 108A-n) monitoring operation of a server cluster (e.g., server cluster 105A-n) having a collection of data servers (e.g., data servers 106A-n) operating thereon. The logset can be generated by the local monitoring device (a) in accordance with a defined schedule, (b) when an operational issue (e.g., operational issue 104A-n) is detected by the local monitoring device occurring at a data server, (c) and suchlike. To minimize operational impact across the collection of servers, an operation at a first data server (e.g., an operation to address an operational issue at a first data server 106A) should not impact operation at the other data servers in the server cluster.

At 520, the logset can be transmitted to, and received by, a health analysis system (HAS) (e.g., received by a logset gather component 115 operating at HAS 110).

At 530, a corrective action (e.g., action 135A-n) can be received by the local monitoring device, wherein the corrective action is received from the HAS. As previously described, the corrective action can be configured to address/fix the operational issue.

At 540, a determination can be made by a confirmation component (e.g., confirmation component 294) operating on the server cluster whether the corrective action can be applied to the data server, e.g., as a function of a confirmation setting (e.g., confirmation setting 296A-n).

At 550, in response to a determination by the confirmation component that NO confirmation is required, process 500 can advance to step 560, whereupon the corrective action can be applied by the LMD to the data server. At 565, the LMD can be configured to monitor operation of the data server in response to application of the corrective action.

At 570, in response to a determination by the LMD that YES, the corrective action addressed the issue, process 500 can advance to step 580, whereupon the LMD can be configured to generate/transmit a notification (e.g., notification 212A-n) to the HAS, wherein the notification indicates the corrective action addresses the issue.

At 580, in response to receiving a notification of the issue was successfully addressed by the corrective action, a database (e.g., database 170) can be updated (e.g., by any of recommendation component 130, data historian 260, and suchlike) to indicate that the corrective action fixed the issue. Hence, the corrective action (e.g., action 135A) is associated with the issue (e.g., current issue 104A) based on the prior issue (e.g., prior issue 147A) and the prior action (e.g., prior action 148A-n) associated therewith.

At 570, in response to a determination by the LMD that NO, the corrective action did not address the issue, process 500 can advance to step 585, whereupon the LMD can be configured to generate/transmit a notification (e.g., notification 212A-n) to the HAS, wherein the notification indicates the corrective action did not address the issue.

At 587, in response to receiving a notification of the issue was not successfully addressed by the corrective action, the database can be updated by any of recommendation component, data historian, and suchlike, to indicate that the corrective action did not fix the issue. Hence, the corrective action (e.g., action 135A) is negatively associated with the issue (e.g., current issue 104A) based on the prior issue (e.g., prior issue 147A) and the prior action (e.g., prior action 148A-n) associated therewith.

At 590, if available, the next corrective action can be identified (e.g., by the recommendation component 130), e.g., based on similarity index $S_n$ (per FIG. 2) and provided to the LMD for implementation on the data server. Process 500 can return to step 540 where a subsequent determination can be made regarding implementing the subsequently identified corrective action.

At 550, in response to a determination by the confirmation component that YES confirmation is required, process 500 can advance to step 592, whereupon an entity (e.g., system administrator/entity 290) can be informed of a confirmation is required to implement the corrective action on the data server. A confirmation component (e.g., confirmation component 294) can be configured to receive the confirmation (e.g., confirmation 295A-n) approved/denied entry from the entity.

At 594, in response to a determination by the confirmation component that YES, confirmation to approve implementation of the corrective action has been received, process 500 can return to step 560, whereupon the corrective action can be applied.

At 594, in response to a determination by the confirmation component that NO, implementation of the corrective action has been denied, process 500 can advance to step 596, whereupon the corrective action can be archived locally (e.g., in a memory 184 at the server cluster/data server) for further investigation/review by the entity. After further review the action can be implemented (e.g., per step 560). Further, a setting of the confirmation can be toggled between "auto-apply action to data server" and "obtain approval before implementing" based on whether the entity wants to implement a current or a subsequently received action.

Figure 6:
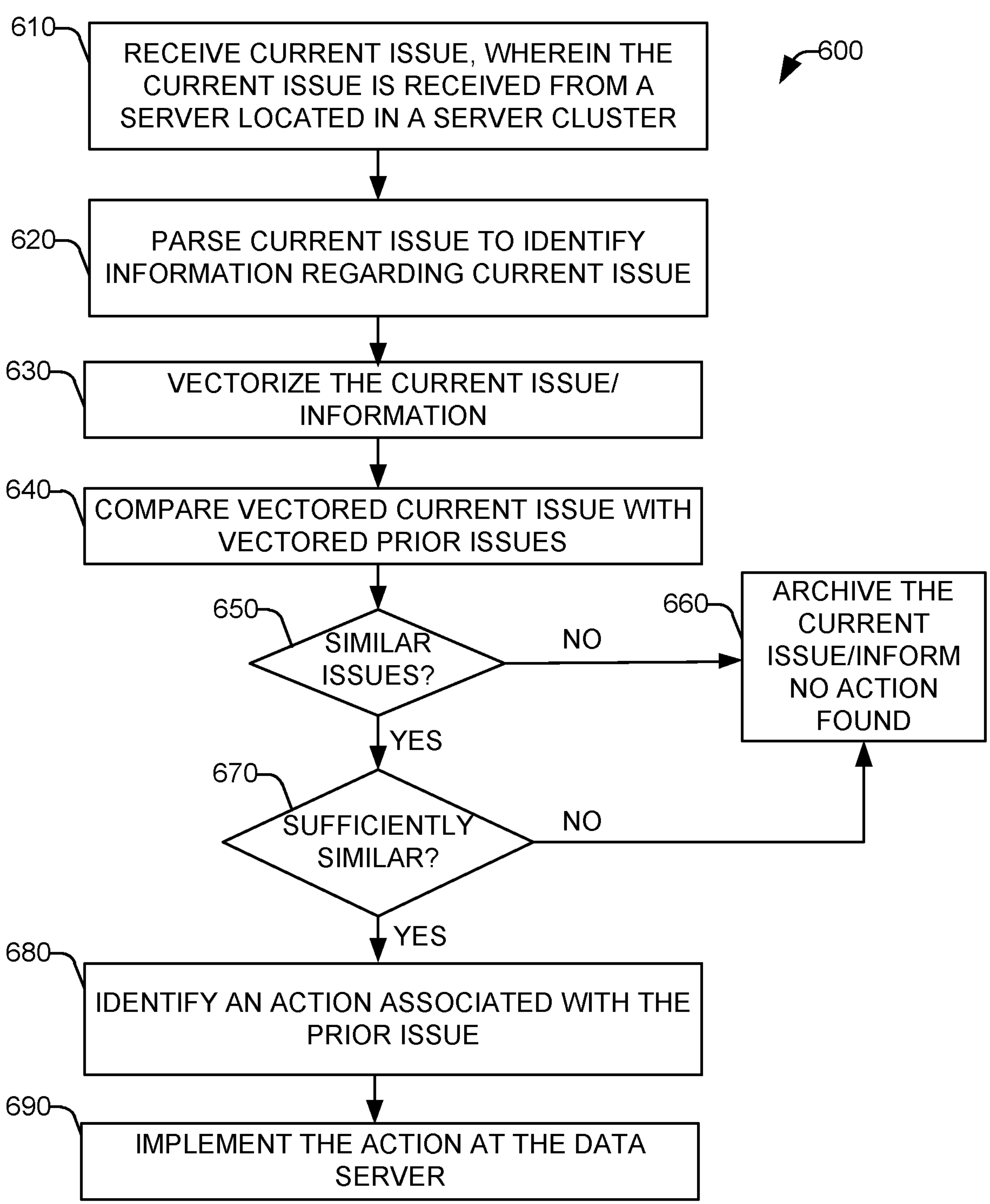
FIG. 6 illustrates a computer-implemented process for automatically determining one or more actions to apply to address an issue, according to one or more embodiments.

In FIG. 6, process 600 illustrates a computer-implemented process for automatically determining one or more actions to apply to address an issue, according to one or more embodiments.

At 610, a current issue (e.g., current issue 104A-n, a first issue) can be received at a health analysis system (e.g., HAS 110). The current issue can be received in a logset (e.g., logset 109A-n) from a local monitoring device (e.g., LMD 108A-n) monitoring operation of a server cluster (e.g., server cluster 105A-n) having a collection of data servers (e.g., data servers 106A-n) operating thereon.

At 620, the logset can be parsed (e.g., by parse component 210) to identify the current operational issues presented in the logset, and further, the current operational issue can be parsed to identify information/features to enable similarity matching with previous issues (e.g., prior issues 147A-n) and/or supplemental information (e.g., supplemental information 149A-n).

At 630, the current issue can be processed to enable the current issue to be characterized based on similarity to a comparable, prior issue (e.g., prior issues 147A-n). In an embodiment, the prior issues can be previously processed and compiled in a database (e.g., database 170). Processing of the current issue can utilize any suitable technology. In an embodiment, a vector component (e.g., vector component 220) can be utilized to represent the functionality, etc., of current issue with vector representation Vx (e.g., vector V305).

At 640, the current issue (having vector representation V305) can be compared with the prior issues (having vector representations V120A-n) to determine similarity (per similarity index $S_{1-n}$) between the current issue and any of the prior issues. A similarity component (e.g., similarity component 230) can be configured to perform the similarity analysis, whereby similarity can be determined based on distance between a first vector (e.g., vector V304) representing the current issue and a second vector (e.g., vector V320A) representing a prior issue in the collection of prior issues (e.g., collection of prior issues 147A-n).

At 650, in response to a determination (e.g., by the similarity component 230) of NO, there are no prior issues (or supplemental information) that are similar to the current issue, process 600 can advance to step 660, whereupon the current issue can be archived (e.g., by similarity component 230, recommendation component 130, data historian 260). The archived prior issue can be subsequently re-assessed for similarity against any further issues that are subsequently characterized by the HAS. In an embodiment, a notification (e.g., a notification 232A-n) can be generated (e.g., by recommendation component 130) and transmitted to a customer support system (e.g., customer support system 140) indicating that further review of current issue is required (e.g., by a customer support entity 142) to resolve the current issue/generate an alternative action to implement at the data server.

At 650, in the event of YES, the current issue is determined to be similar to one or more prior issues/supplemental information, process 600 can advance to step 670. At 670, the degree of similarity between the current issue and the one or more prior issues/supplemental information can be assessed by the similarity component, wherein the similarity component can utilize similarity thresholds (e.g., similarity thresholds 235A-n) to determine whether a similarity (e.g., similarity $S_n$) determined between a prior issue has sufficient similarity to the current issue to enable associating the current issue with a prior issue/supplemental information to enable a prior action (e.g., prior action 148A-n) to be identified. In the event of a determination of NO, insufficient similarity exists (e.g., $S_n$<threshold 235A) between the current issue and the one or more identified pre-existing codes, e.g., a required threshold of similarity was not met, process 600 can return to step 660, whereupon the current issue can be archived, as previously mentioned.

At 670, in the event of YES, a threshold of similarity was met (e.g., $S_n$≥threshold 235A), process 600 can advance to step 680, whereupon the recommendation component can be configured to apply a prior action (e.g., prior action 148A-n) previously associated with the similar prior issue as an action (e.g., action 135A-n) of the current issue.

At 690, as previously described, the current action can be applied at the data server to address the current issue, in conjunction with a notification (e.g., notification 212A-n) generated in response to determining whether the current issue was resolved by the current action or not.

With regard to acts 670, 680, 690, in an embodiment, as previously mentioned, more than one prior issue can be identified as being comparable/similar to the current issue, and furthermore than one prior action respectively associated with the one or more comparable/similar prior issues. In such a scenario, the respective prior issues and prior actions can be further reviewed and ranked (e.g., by similarity component 230 and/or recommendation component 130) with regard to the efficacy of the respective issue/action addressing the current issue.

Figure 7:
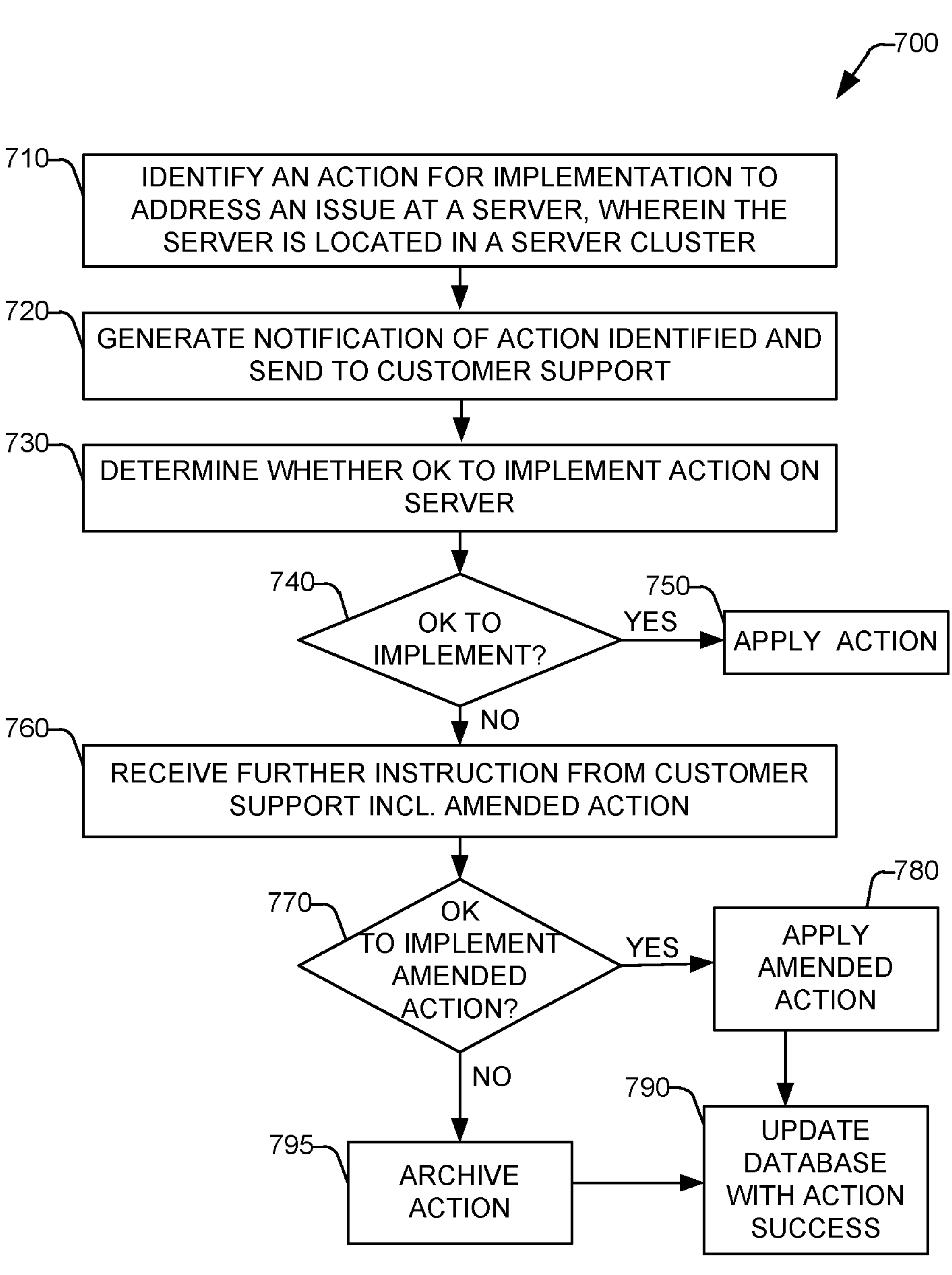
FIG. 7 illustrates a computer-implemented process to enabling editing of an automatically generated corrective action to a current issue at a data server, according to one or more embodiments.

In FIG. 7, process 700 illustrates a computer-implemented process to enabling editing of an automatically generated corrective action to a current issue at a data server, according to one or more embodiments.

At 710, an action (e.g., prior action 148A-n) can be identified (e.g., by a recommendation component 130) for implementation as a corrective action (e.g., as action 135A- n) for a current issue (e.g., current issue 104A-n) occurring/identified at a data server (e.g., data server 106A-n).

At 720, a notification (e.g., notification 232A-n) can be generated (e.g., by recommendation component 130) and transmitted to a customer support system (e.g., customer support system 140) indicating a potential corrective action has been identified for the current issue. In an embodiment, the proposed corrective action can be provided in the notification to an entity (e.g., customer support engineer 142) for review.

At 730, after review/determination by the entity of the proposed corrective action, a further notification (e.g., notification 232A-n) can be received from the entity by the recommendation component, wherein the recommendation component can be configured to further determine whether the proposed action is acceptable to implement.

At 740, in response to a determination by the recommendation component that entity has indicated YES, the action is suitable for implementation, process 700 can advance to step 750, such that the action (e.g., as action 135A-n) is implemented on the data server, as previously described.

At 740, in response to a determination by the recommendation component that entity has indicated NO, the action is not currently suitable for implementation, process 700 can advance to step 760, whereupon further information can be received from the entity, potentially including an amended version of the initial action provided to the customer support system (e.g., at step such that the action (e.g., as action 135A-n) to be implemented on the data server, as previously described.

At 770, in response to a further determination by the recommendation component that entity has indicated YES, the amended action is suitable for implementation, process 700 can advance to step 780, such that the amended action (e.g., as action 135A-n) is implemented on the data server, as previously described.

At 790, the database (e.g., database 170) can be updated by any of recommendation component, data historian, and suchlike, to indicate that an amended corrective action was implemented, with the amended corrective action stored in the database in conjunction with any of the current issue, initial corrective action, prior issue, prior action, as previously described.

At 770, in response to a further determination by the recommendation component that entity has indicated NO, an amended action or original action suitable for implementation is not available, process 700 can advance to step 795, such that the amended action (e.g., as action 135A-n) is implemented on the data server, as previously described.

At 795, in response to receiving a notification of no issue is available to address the current issue, the database can be updated by any of recommendation component, data historian, and suchlike, to indicate that no corrective action is available. Hence, the corrective action/amended corrective (e.g., action 135A) is negatively associated with the issue (e.g., current issue 104A) based on the prior issue (e.g., prior issue 147A) and the prior action (e.g., prior action 148A-n) associated therewith, or the supplemental information (e.g., supplemental information 149A-n).

Figure 8:
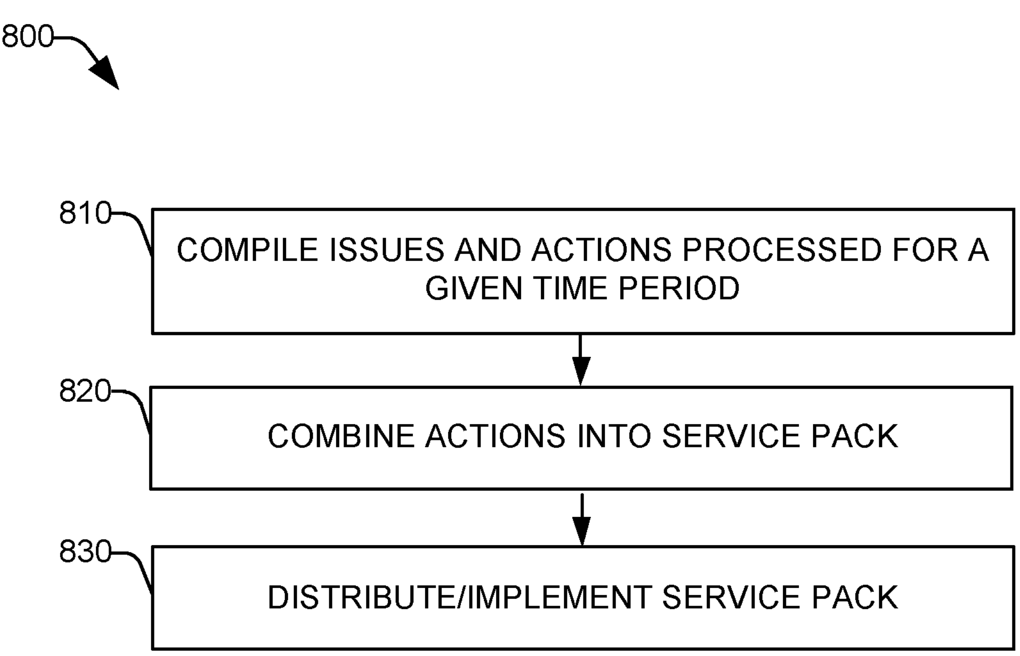
FIG. 8 illustrates a computer-implemented process for automatically generating a software service pack from a series of issues and actions compiled over a period of time, according to one or more embodiments.

In FIG. 8, process 800 illustrates a computer-implemented process for automatically generating a software service pack from a series of issues and actions compiled over a period of time, according to one or more embodiments.

At 810, for a defined period of time (e.g., since a previous software service pack was generated and distributed) any of the current issues (e.g., current issues 104A-n), prior issues (e.g., prior issues 147A-n), prior actions (e.g., prior actions 148A-n), proposed corrective actions (e.g., actions 135A-n, amended actions), and suchlike can be identified (e.g., by service pack component 285, data historian 260) as compiled in a database (e.g., database 170).

At 820, the respective current issues, prior issues, prior actions, proposed corrective actions, amended actions, and suchlike can be compiled and combined into a software service pack. A customer support entity (e.g., entity 142) can review the identified issues, actions, etc., to determine what actions are to be included in the service pack.

At 830, the service pack can be distributed for implementation on the respective server clusters (e.g., server clusters 105A-n) and associated data servers (e.g., data servers 106A-n). As previously described, the respective actions (e.g., actions 135A-n) are configured to be directed towards a specific data server without impacting operation of other data servers. The service pack can be implemented in a manner that may require operation of more than one data server to be simultaneously impacted.

Per the various embodiments presented herein, various components included in the HAS 110, e.g., analysis component 120, logset gather component 115, recommendation component 130, parse component 210, vector component 220, similarity component 230, process component 150, data historian 260, software pack component 285, edit component 240, LMD 108A-n, confirmation component 294A-n, and suchlike, can include AI and ML reasoning techniques and technologies that employ probabilistic and/or statistical-based analysis to prognose or infer an action that a user desires to be automatically performed. The various embodiments presented herein can utilize various machine learning-based schemes for carrying out various aspects thereof. For example, a process (e.g., by analysis component 120) for identifying/determining an operational issue exists at a data server, and further, determining/implementing an action to correct the operational issue, and suchlike, as previously mentioned herein, can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence (class(x)). Such classification can employ a probabilistic and/or statistical-based analysis (e.g., factoring into the analysis utilities and costs) to prognose or infer an action that a user desires to be automatically performed (e.g., identification and correction of an operational issue, and operations related thereto).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to predetermined criteria, probability of an identified action will correct an operational issue at a data server, for example.

As described supra, inferences can be made, and operations performed, based on numerous pieces of information. For example, whether a received logset 109A-n includes an operational issue 104A-n at a data server 106A-n, and whether an action 135A-n/148A-n can be implemented to correct the operational issue 104A-n, e.g., as a function of a prior operational issue 147A-n being sufficiently similar to the operational issue 104A-n, and suchlike, to enable the data server 106A-n to return to an optimal operating condition without impacting operation of other data servers 106B-n co-located with a data server 106B-n co-located at a server cluster 105A-n.

Example Environments of Use

Figure 9:
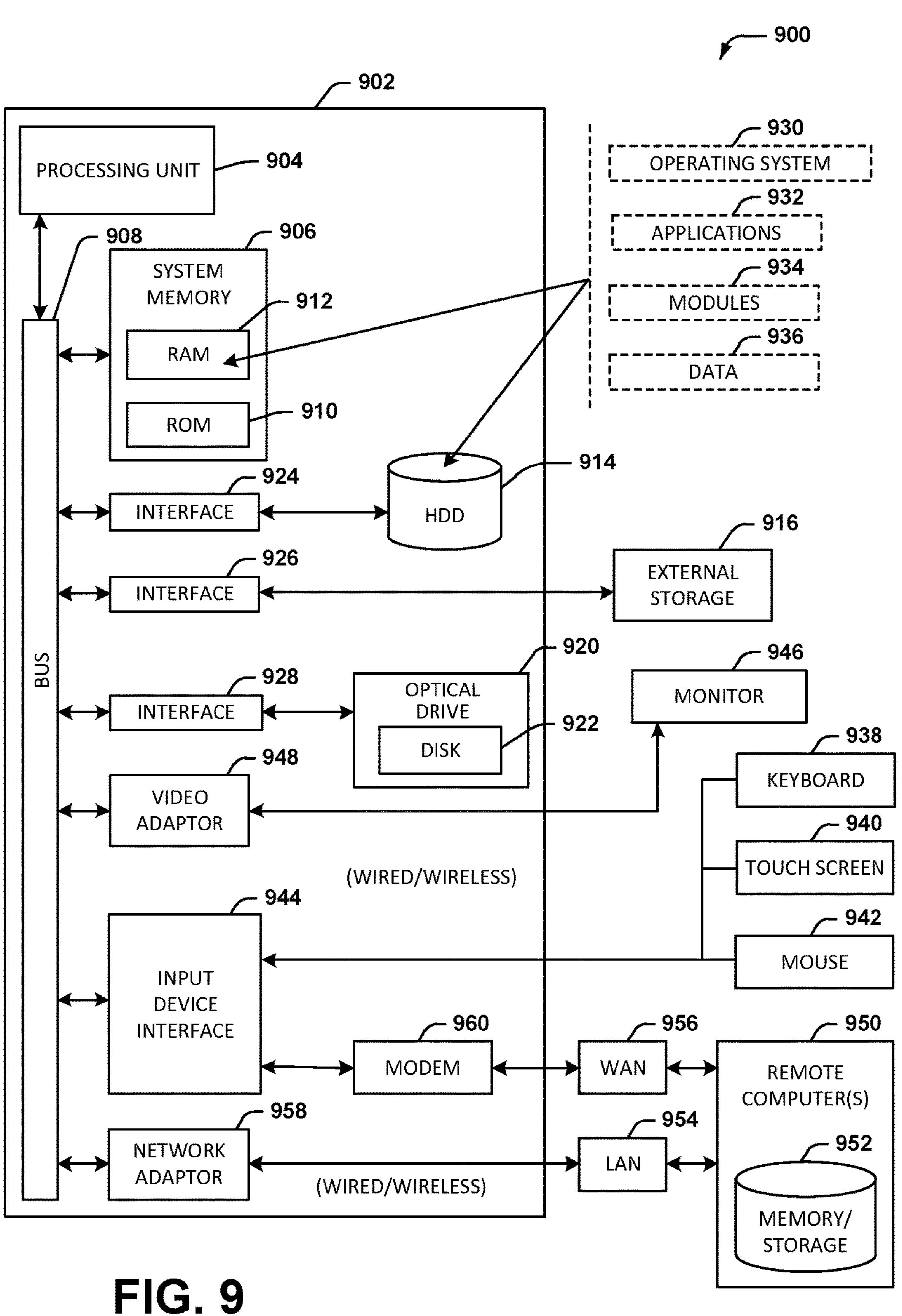
FIG. 9 depicts an example schematic block diagram of a computing environment with which the disclosed subject matter can interact/be implemented at least in part, in accordance with various aspects and implementations of the subject disclosure.
Figure 10:
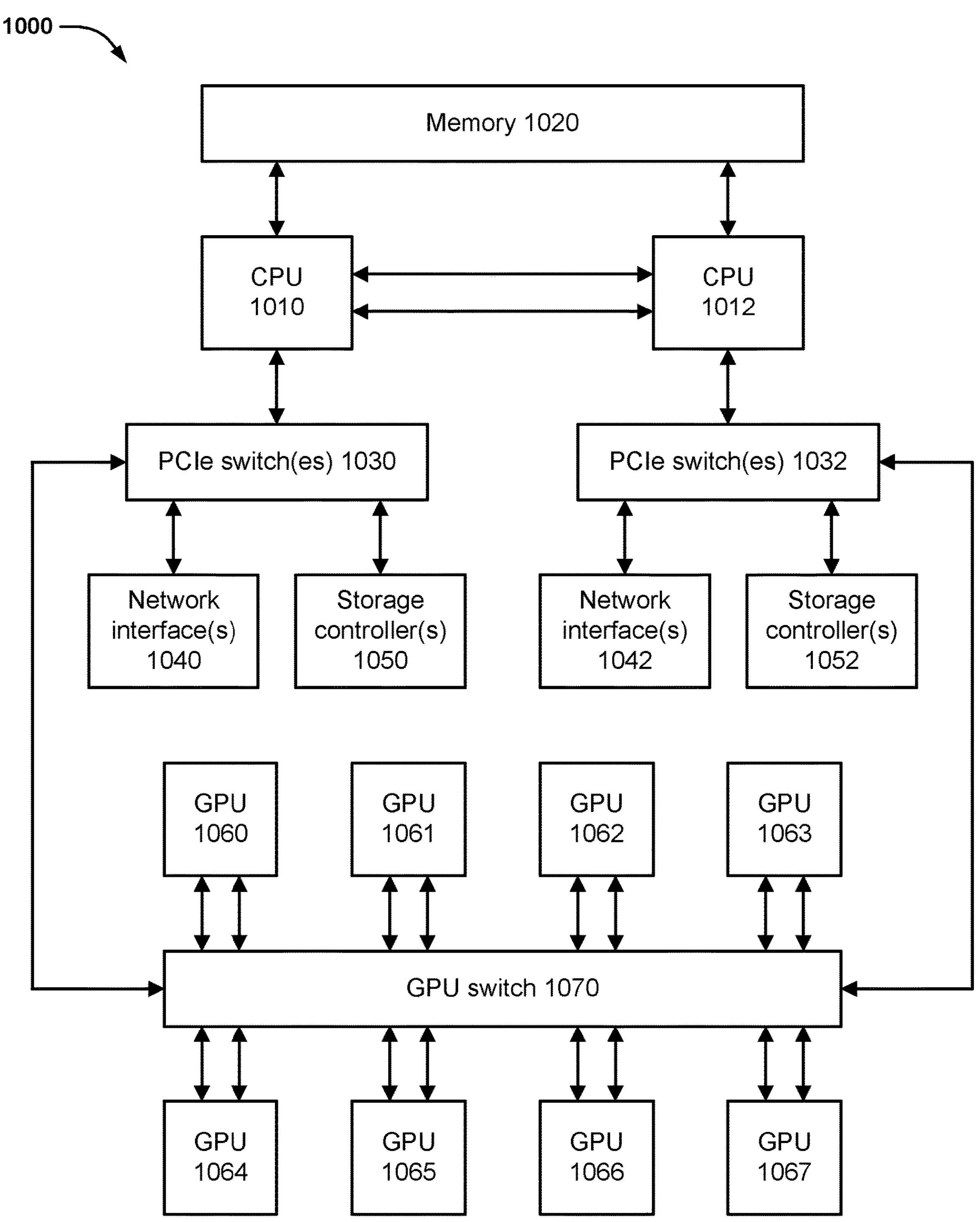
FIG. 10 is a diagram of an example computing environment in which various implementations described herein can function.
Figure 11:
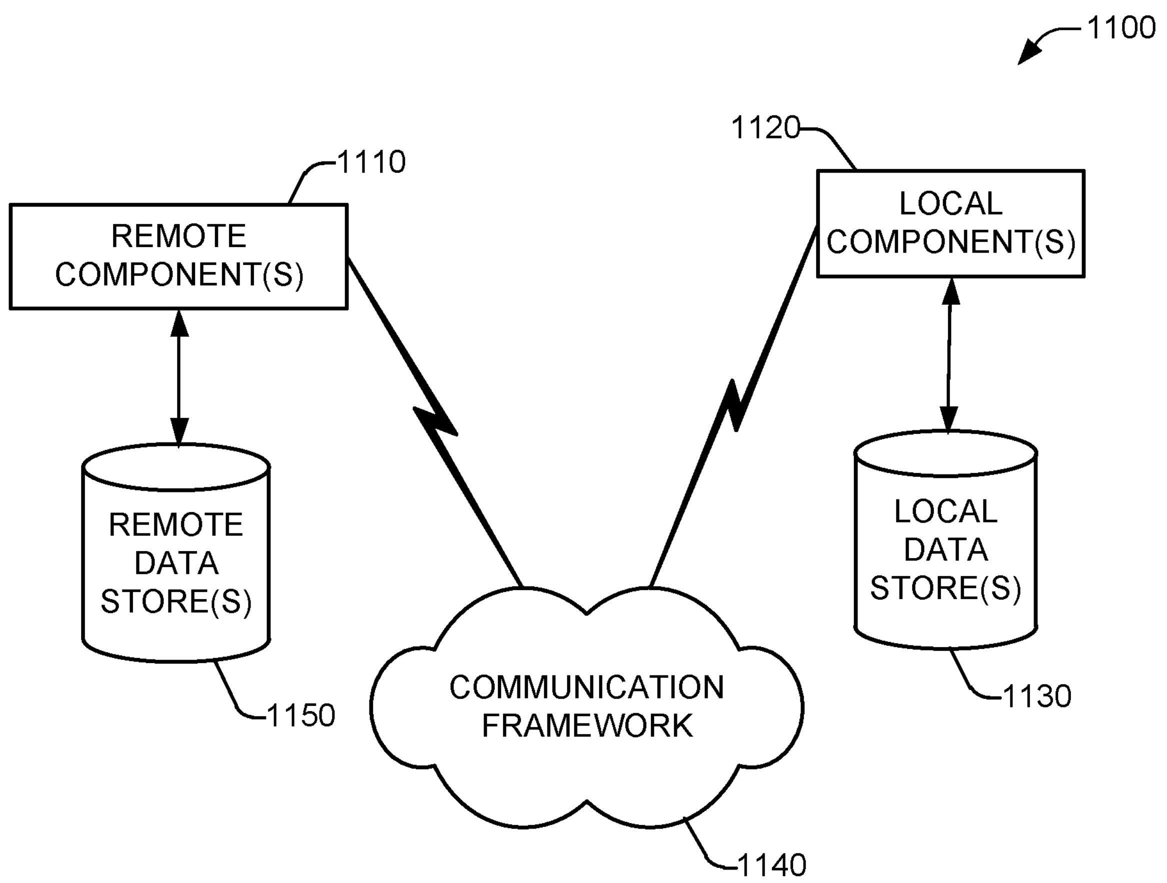
FIG. 11 is a block diagram representing an example computing environment into which aspects of the subject matter described herein may be incorporated.

Turning next to FIGS. 9-11, a detailed description is provided of additional context for the one or more embodiments described herein with FIGS. 1A-8.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors and may include a cache memory. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1084 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can comprise a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1094 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Turning next to FIG. 10, an example server architecture 1000 that can be utilized in connection with one or more implementations described above is illustrated. The server architecture 1000 shown in FIG. 10 can be associated with a server device, such as a rackmount server, a blade server, or the like, which can be physically and/or communicatively coupled to a chassis (not shown in FIG. 10) and/or other physical devices for use in a computing environment such as a computing cloud, a data center, etc.

The server architecture 1000 shown in FIG. 10, referred to below as simply a server for brevity, can include one or more central processing units (CPUs), here two CPUs 1010, 1012. In a typical implementation of the server 1000, the CPUs 1010, 1012 are high-performance server processors that provide scalability and a high number of processing cores per CPU, e.g., up to 56 cores per processor for current implementations. The CPUs 1010, 1012 of the server 1000 are communicatively coupled to each other by, e.g., processor interconnect links, such as QuickPath Interconnect (QPI) or Ultra Path Interconnect (UPI) links developed by the Intel® Corporation. Alternatively, other means for coupling the CPUs 1010, 1012, such as a front side bus (FSB) or the like, could also be used. While two interconnect links are shown in FIG. 10 coupling CPUs 1010 and 1012, it is noted that more, or fewer, links could also be used.

The CPUs 1010, 1012 shown in FIG. 10 are additionally coupled to a system memory 1020, which can include one or more Dual In-line Memory Modules (DIMMs) and/or other devices. While the system memory 1020 is illustrated as a single block in FIG. 10 for simplicity, it is noted that the system memory 1020 is typically implemented via a group of memory modules. For example, the CPUs 1010, 1012 can collectively be associated with a number of DIMM slots (e.g., 16 slots, 32 slots, etc.), and DIMMs making up the system memory 1020 can be placed into these slots to facilitate connection to the CPUs 1010, 1012. Depending on implementation, the memory modules making up the system memory 1020 can be communicatively coupled to one, or more, of the CPUs 1010, 1012.

As further shown in FIG. 10, Peripheral Component Interconnect Express (PCIe) switches 1030, 1032 can connect the CPUs 1010, 1012 to respective other components of the server 1000, such as network interfaces 1040, 1042, storage controllers 1050, 1052, or the like. The network interfaces 1040, 1042 can include network interface cards (NICs) and/or other suitable components to facilitate connecting the server 1000 to other servers or suitable computing devices, e.g., in a clustered computing environment. The storage controllers 1050, 1052 can include nonvolatile memory express (NVMe) controllers and/or other interface devices that facilitate the coupling of storage devices, such as non-volatile RAM (NVRAM) devices, SSDs, or the like, to the server 1000.

While FIG. 10 shows a configuration in which each CPU 1010, 1012 is connected to one PCIe switch 1030, 1032, other configurations could be used. For instance, a one-to-many or many-to-one connection scheme could be used between the CPUs 1010, 1012 and the PCIe switches 1030, 1032. Similarly, the network interfaces 1040, 1042 and storage controllers 1050, 1052 could be connected to the PCIe switches 1030, 1032 in a one-to-many or many-to-one configuration in addition to, or in place of, the one-to-one connection scheme shown in FIG. 10.

The server 1000 shown in FIG. 10 further includes a group of co-processors, such as graphics processing units (GPUs), intelligence processing units (IPUs) for artificial intelligence workloads, etc.; in FIG. 10, there are eight GPUs 1060-1067, which provide further processing capability to server 1000. While eight GPUs 1060-1067 are shown in FIG. 10, more, or fewer, GPUs could also be used. The GPUs 1060-1067 of server 1000 are preferably specialized GPUs that are designed for high-performance computing applications, such as H100 and/or A100 GPUs developed by the NVIDIA® Corporation, although other GPUs could also be used. Each of the GPUs 1060-1067 of the server are communicatively coupled to each other via suitable communications links, such as NVLink® interconnects developed by the NVIDIA® Corporation and/or other suitable connections. In the example shown by FIG. 10, a GPU switch 1070 facilitates full interconnection between the GPUs 1060-1067. In other implementations, the GPUs 1060-1067 could instead be interconnected directly without the use of a switch or other means.

As additionally shown by FIG. 10, the GPU switch 1070 is communicatively coupled to the PCIe switches 1030, 1032 to enable communication between the GPUs 1060-1067 and other components of the server 1000. Other connection schemes could also be used. For instance, one or more of the GPUs 1060-1067 could connect to the PCIe switches 1030, 1032 and/or the CPUs 1010, 1012 directly, e.g., in an implementation in which a GPU switch 1070 is not present.

Referring now to details of one or more elements illustrated in FIG. 11, an illustrative cloud computing environment 1100 is depicted. FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110 and 1120, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor, and a memory coupled to the at least one processor and having instructions stored thereon, wherein, in response to the at least one processor, the instructions facilitate performance of operations, comprising:

receiving a first notification of a current operational issue, wherein the current operational issue is occurring at a data server, wherein the data server is remotely located from the system;

identifying a prior operational issue having at least one feature comparable to the current operational issue according to a defined similarity criterion;

identifying a first action associated with the prior operational issue;

instructing the data server to implement the first action to address the current operational issue;

receiving a second notification from the data server;

in response to determining that the second notification indicates that the first action first action did not fix the current operational issue, identifying a second action associated with the prior operational issue; and instructing the data server to implement the second action to address the current operational issue.

2. The system of claim 1, wherein the data server is included in a collection of servers located in a server cluster.

3. The system of claim 2, wherein the first notification comprises an identifier configured to identify at least one of the data server, at least one component included in the data server, an application hosted by the data server, or a location of the server cluster.

4. The system of claim 1, wherein the first action comprises at least one of rebooting the data server, power cycling the data server, terminating operation of the data server, terminating operation of an application hosted by the data server, adjusting a system configuration pertaining to the data server, adjusting a configuration of an application implemented on the data server, throttle operation of an application implemented on the data server, adjust an operational threshold of an application hosted on the data server, or adjust an operational threshold of a component pertinent to operation of the data server.

5. The system of claim 4, wherein the data server is a first data server included in a collection of servers, wherein the collection of servers comprises an nth data server, while implementing operation of the action on the first data server, a current operational status of the nth server remains unchanged.

6. The system of claim 1, wherein the first action implemented at the data server is an edited action, the operations further comprise:

informing a customer support system of the first action; and in response to the informing, receiving an edit to the first action via information received from the customer support system, to generate the edited action.

7. The system of claim 1, wherein the operations further comprise:

receiving a third notification from the data server, wherein the third notification indicates the second action has been implemented at the data server; and further monitoring operation of the data server for a subsequent operational issue.

8. The system of claim 1, wherein the first action and second action are included in a collection of actions associated with the prior operational issue, and wherein second action is determined to have a lower probability of fixing the current operational issue than the first action.

9. A computer-implemented method, comprising:

receiving, by a device comprising at least one processor, a first notification identifying a current operational issue identified at a data server, wherein the data server is remotely located from the device;

identifying, by the device, a prior operational issue having at least one feature comparable to the current operational issue according to a defined similarity criterion;

identifying, by the device, a first action associated with the prior operational issue;

instructing, by the device, the data server to implement the first action to address the current operational issue;

receiving, by the device, a second notification, wherein the second notification indicates the first action did not fix the current operational issue;

identifying, by the device, a second action associated with the prior operational issue; and instructing, by the device, the data server to implement the second action to address the current operational issue.

10. The computer-implemented method of claim 9, further comprising:

parsing, by the device, a logset reporting operation of the data server; and identifying, by the device, the current operational issue in the logset.

11. The computer-implemented method of claim 10, wherein the logset is generated in accordance with a defined schedule.

12. The computer-implemented method of claim 9, wherein the data server is included in a collection of data servers located in a same server cluster.

13. The computer-implemented method of claim 12, wherein the data server is a first data server, wherein the collection of servers further comprises a second data server, and wherein the first action is configured for implementation at the first data server, while operation of the second server remains unchanged as a function of the first action being implemented on the first data server.

14. The computer-implemented method of claim 13, wherein the first action comprises at least one of rebooting the first data server, power cycling the first data server, terminating operation of the first data server, terminating operation of an application hosted by the first data server, adjusting a system configuration pertaining to the first data server, adjusting a configuration of an application implemented on the first data server, throttle operation of an application implemented on the first data server, adjust an operational threshold of an application hosted on the first data server, or adjust an operational threshold of a component pertinent to operation of the first data server.

15. The computer-implemented method of claim 9, wherein the first action and second action are included in a collection of actions associated with the prior operational issue, and wherein second action is determined to have a lower probability of fixing the current operational issue than the first action.

16. The computer-implemented method of claim 9, further comprising:

receiving, by the device, a third notification from the data server, wherein the third notification indicates the second action has been implemented at the data server; and further monitoring, by the device, operation of the data server for a subsequent operational issue.

17. A computer program product stored on a non-transitory computer-readable medium and comprising machine-executable instructions, wherein, in response to being executed, the machine-executable instructions cause computing equipment to perform operations, comprising:

receiving a first notification of a current operational issue occurring at a data server, wherein the data server is remotely located from the computing equipment;

identifying a prior operational issue having at least one feature comparable to the current operational issue according to a defined similarity criterion;

identifying a first action associated with the prior operational issue;

instructing the data server to implement the first action;

receiving a second notification indicating the first action did not fix the current operational issue;

identifying a second action associated with the prior operational issue; and instructing the data server to implement the second action to address the current operational issue.

18. The computer program product according to claim 17, wherein the first action comprises at least one of rebooting the data server, power cycling the data server, terminating operation of the data server, terminating operation of an application hosted by the data server, adjusting a system configuration pertaining to the data server, adjusting a configuration of an application implemented on the data server, throttle operation of an application implemented on the data server, adjust an operational threshold of an application hosted on the data server, or adjust an operational threshold of a component pertinent to operation of the data server.

19. The computer program product according to claim 17, wherein the current operational issue is a first current operational issue, wherein the data server is a first data server, and wherein the operations further comprise:

receiving a second current operational issue, wherein the second current operational issue is received from a second data server;

determining the second current operational issue is comparable to the first current operational issue according to the defined similarity criterion; and instructing the first action be implemented on the second data server to address the second current operational issue.

20. The computer program product according to claim 17, wherein the operations further comprising:

receiving a third notification from the data server, wherein the third notification indicates the second action has been implemented at the data server; and further monitoring operation of the data server for a subsequent operational issue.

* * * * *